United States Patent [19]

Girvin

[11] Patent Number: 4,786,072

[45] Date of Patent: Nov. 22, 1988

[54] COLLAPSIBLE WHEELCHAIR AND LIFT ASSEMBLY

[75] Inventor: Robert H. Girvin, Holliston, Mass.

[73] Assignee: K G Engineering, Inc., Woonsocket, R.I.

[21] Appl. No.: 62,467

[22] Filed: Jun. 15, 1987

[51] Int. Cl.[4] .................................................. B60P 1/46

[52] U.S. Cl. ............................ 280/289 WC; 280/647; 297/DIG. 4; 414/541; 414/921

[58] Field of Search ............... 280/242 WC, 289 WC, 280/647; 297/DIG. 4; 414/541, 542, 543, 921

[56] References Cited

U.S. PATENT DOCUMENTS

| | | | |
|---|---|---|---|
| 3,515,294 | 6/1970 | Southward et al. | 414/921 X |
| 3,638,813 | 2/1972 | Strong | 414/921 X |
| 4,170,368 | 10/1979 | Southward et al. | 280/289 WC X |
| 4,483,653 | 11/1984 | Waite | 414/921 X |
| 4,566,842 | 1/1986 | Clarke | 414/541 X |
| 4,661,035 | 4/1987 | Danielsson | 280/289 WC X |

FOREIGN PATENT DOCUMENTS

| | | | |
|---|---|---|---|
| 2452401 | 11/1980 | France | 280/289 WC |
| 2456001 | 1/1981 | France | 414/921 |

*Primary Examiner*—John J. Love
*Assistant Examiner*—Charles R. Watts
*Attorney, Agent, or Firm*—Salter & Michaelson

[57] ABSTRACT

A collapsible wheelchair and a lift assembly which is permanently mountable in a vehicle and operable for moving the wheelchair and an occupant thereof between the interior and the exterior of the vehicle. The wheelchair includes a chair member and a pair of enlarged rear wheels on the chair member which are operable for movably supporting the rear portion of the chair member on a supporting surface when the chair member is in the erected position thereof. The wheelchair is movable to a collapsed position wherein one of the rear wheels is positioned behind the back portion of the chair member in substantially parallel relation therewith and the other rear wheel is positioned beneath the seat portion of the chair member in substantially parallel relation therewith. When the wheelchair is in the collapsed position, it has a reduced overall profile to enable the wheelchair and an occupant thereof to be effectively moved between the interior and the exterior of a vehicle with the lift assembly.

8 Claims, 9 Drawing Sheets

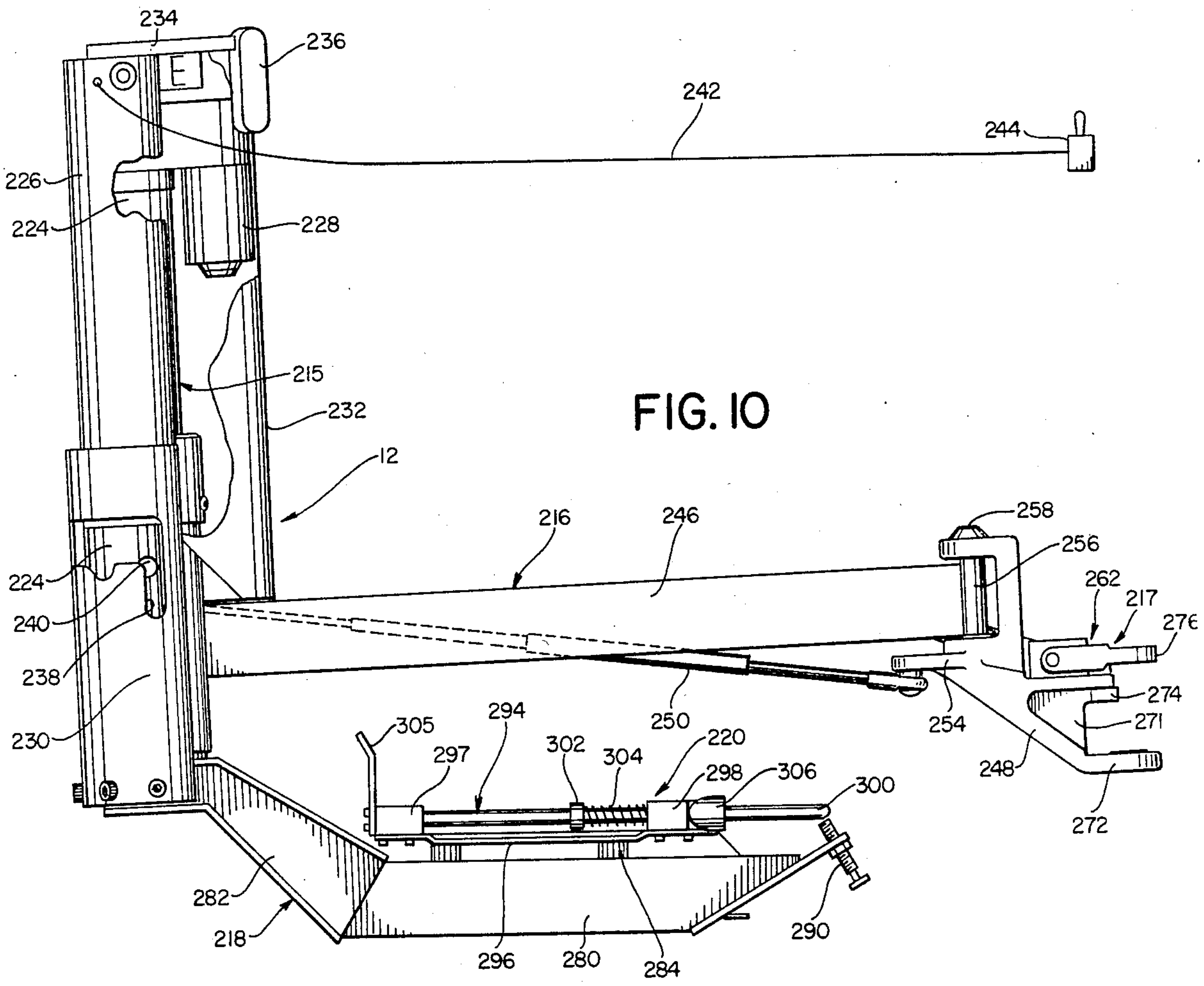
FIG. 10
FIG. 11
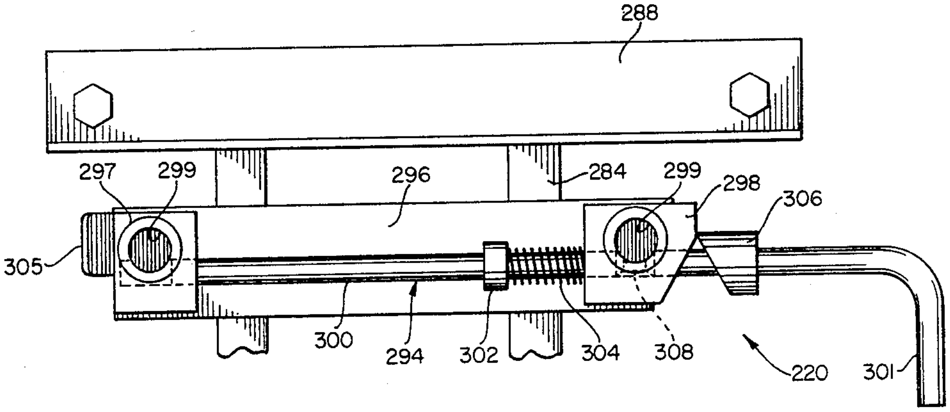
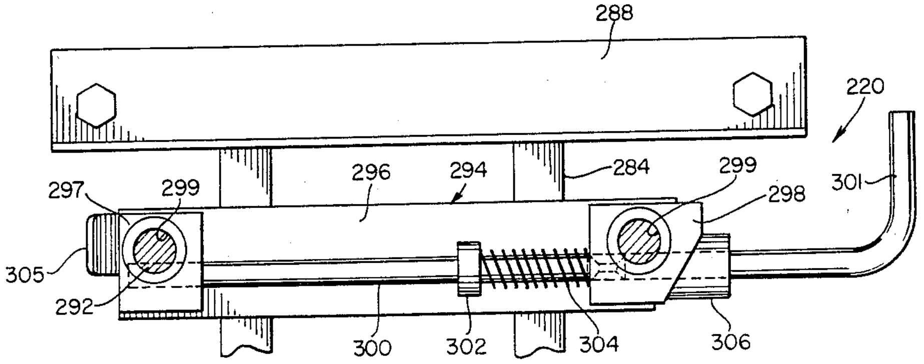
FIG. 12

COLLAPSIBLE WHEELCHAIR AND LIFT ASSEMBLY

BACKGROUND AND SUMMARY OF THE INVENTION

The instant invention relates to apparatus for assisting persons who are at least partially handicapped or disabled to enter into and exit from vehicles, and more particularly to a collapsible wheelchair and to a lift assembly which is adapted to be permanently installed in a vehicle, such as an automobile, for assisting a handicapped person to enter into and exit from the vehicle while seated in the wheelchair.

In recent years there has been an increased recognition of the special needs of persons suffering from various disabling or partially disabling handicaps. Further, as a result of this increased awareness, various types of apparatus have been developed for assisting handicapped persons to enter into and exit from vehicles. In this regard, it has been found that the types of apparatus which are operable in combination with conventional passenger automobiles are preferable to other types of apparatus, since they generally enable disabled persons to be installed in vehicles so that they are positioned in normal riding positions therein. Apparatus of this general type are disclosed in the U.S. Patents to SOUTHWARD et al, U.S. Pat. No. 4,170,368; SEGUELA et al, U.S. Pat. No. 4,278,387; ANTONELLIS, U.S. Pat. No. 4,354,791; BRIGMAN et al, U.S. Pat. No. 4,365,924; WAITE, U.S. Pat. No. 4,483,653 and WAITE, U.S. Pat. No. 4,542,917. However, the apparatus disclosed in these references have generally required relatively complex wheelchair assemblies, and therefore they have been less than entirely practical for day-to-day use, and they have also not been adapted for simple and easy operation. Other wheelchairs and similar apparatus which, in addition to the above references, represent the closest prior art to the subject invention of which the applicant is aware are disclosed in the U.S. patents to SOUTHWARD et al, U.S. Pat. No. 3,515,294; GREER, U.S. Pat. No. 3,618,968; WILLIAMS, U.S. Pat. No. 3,758,150; SCHIOWITZ, U.S. Pat. No. 3,955,847; MASHUDA, U.S. Pat. No. 3,964,786; ROTHSCHILD, U.S. Pat. No. 4,025,088; DAKE, U.S. Pat. No. 4,142,641; WILLIAMS, U.S. Pat. No. 4,273,350; VONSBAECK et al, U.S. Pat. No. 4,280,716; POBOCIK et al, U.S. Pat. No. 4,299,527; GALL et al, U.S. Pat. No. 4,326,732; WEIGT, U.S. Pat. No. 4,339,013; and LOVELL et al, U.S. Pat. No. 4,380,343. However, these references also fail to provide either a simple collapsible wheelchair or an effective and simple lifting assembly which is operable in combination with a collapsible wheelchair. In any event, none of the above references anticipate the novel structural features and concepts of the wheelchair and/or the lift assembly of the subject invention; and hence, all of the above references are believed to be of only general interest with respect thereto, as will hereinafter be made more apparent.

The instant invention provides a novel collapsible wheelchair which is highly effective and simple to operate and an effective lifting mechanism which is operable in combination with the wheel chair for assisting handicapped persons to enter into and exit from vehicles. More specifically, the collapsible wheelchair of the subject invention comprises a chair member having a seat portion and a back portion, a pair of front wheels, means mounting the front wheels on the chair member so that they are normally operable for movably supporting the front portion of the chair member on a supporting surface. The wheelchair further comprises a pair of rear wheels, and means mounting the rear wheels on the chair member so that they are normally operable for movably supporting the rear portion of the chair member on a supporting surface but so that they are movable to collapsed positions to enable the wheelchair to be installed in a vehicle. More specifically, the rear wheels are preferably mounted so that one of the rear wheels is movable to a collapsed position wherein it is positioned beneath the seat portion of the chair member and in substantially parallel relation with the seat portion and so that the other rear wheel is movable to a collapsed position wherein it is positioned behind the back portion of the chair member and in substantially parallel relation with the back portion. The means mounting the front wheels on the chair member is preferably operable for mounting the front wheels so that they are normally positioned beneath the front portion of the seat portion but so that they are movable to elevated or raised positions, wherein they are pivoted upwardly and forwardly relative to the seat portion and positioned in forwardly spaced relation to the chair member. The wheelchair preferably further comprises foot support means for supporting the feet of an occupant of the seat portion and means mounting the foot support means on the chair member so that the foot support means is movable between a first position wherein it is operative for supporting the feet of the occupant with the occupant's legs extending substantially downwardly from the seat portion and a raised second position wherein the foot support means is operative for supporting the feet of the occupant with the occupant's legs extending forwardly from the seat portion. In addition, the wheelchair preferably further comprises manually operable crank means for mechanically moving the front wheels between the operative positions thereof and the raised positions thereof, and for moving the foot support means between the first and second positions thereof when the front wheels are moved between the operative and raised positions thereof.

The lift assembly of the subject invention which is operable in combination with the above-described wheelchair comprises a column member which is adapted to be mounted in an automobile in a substantially vertical disposition substantially along the longitudinal center line of the vehicle so that it is inboard of a chair station in the vehicle, an elongated main pivot arm attached to the column member and pivotable in a substantially horizontal plane about the axis of the column member, an outer pivot arm attached to the main pivot arm adjacent the outer end thereof and pivotable in a substantially horizontal plane with respect to the main pivot arm, and coupling means for coupling the outer end of the outer pivot arm to a wheelchair so that the wheelchair is pivotable in a substantially horizontal plane with respect to the outer pivot arm. The main and outer pivot arms are preferably dimensioned so that the combined length thereof is sufficient to extend through an open door of a vehicle in which the lift assembly is mounted in order to position the coupling means on the exterior of the vehicle, and the lift assembly further comprises lift means which is operable for vertically repositioning the main pivot arm on the column member to thereby vertically reposition the wheelchair and an occupant thereof with respect to the vehicle. Accordingly, the lift assembly is operable in combination with a wheelchair by first coupling the lift assembly to the wheelchair, then collapsing the wheelchair and vertically repositioning the wheelchair to align it with the adjacent open door of the vehicle and then swinging or pivoting the wheelchair into the vehicle. The lift assembly is preferably utilized in combination with an automobile having bucket-type seats, one of which is removed to provide a chair station for accommodating the wheelchair; and the lift assembly preferably further includes means for releasably anchoring the wheelchair in an automobile. Further, the coupling means preferably includes a first portion which is permanently mounted on one side of the chair member adjacent the front end thereof, and a second portion which is permanently mounted on the outer end of the outer arm and which is interengageable with the first portion of the coupling means for pivotably coupling the wheelchair to the outer arm.

It is seen therefore that both the wheelchair of the subject invention and the lift assembly of the subject invention have significant advantages over the heretofore available prior art devices. Specifically, the wheelchair is collapsible in a unique and simple manner to enable it to be easily and effectively moved between the exterior and the interior of a vehicle. In this regard, the wheels of the wheelchair of the subject invention are readily and easily repositionable in collapsed positions wherein the wheelchair has a reduced overall dimension to enable it to be effectively accommodated in the interior of a vehicle, such as a standard midsized automobile. In addition, because the wheelchair is positionable in a collapsed disposition without removing the wheels or other components thereof, it is not necessary for removed wheels or other parts of the wheelchair to be stored in the trunk or another storage area when the wheelchair is transported in the vehicle. Further, because of the manner in which the wheelchair is collapsible, the wheelchair can be constructed with conventional 24 inch rear wheels so that it can be effectively propelled by an occupant in a conventional manner, and it does not require an electrical propulsion system, etc. In addition, the lift assembly of the subject invention is operable for moving a wheelchair and an occupant thereof into a chair station a vehicle in a simple and efficient manner and for positioning the wheelchair so that the occupant thereof is located in a normal seating position in the vehicle. The lift assembly is also operable for moving other types of specially adapted seats or chair members, including specially adapted bucket-type automobile seats, into and out of the vehicle. Still further, because of the manner in which the lift assembly is operable for both lifting and pivoting a wheelchair and an occupant thereof, it is possible to move the wheelchair and the occupant into a vehicle with a minimum of stress to the occupant by first directing the outwardly extending feet of the occupant into the vehicle and then swinging the main portion of the chair into the vehicle. Even further, the lift assembly is adapted to be coupled to a wheelchair proximal the front portion of the adjacent side thereof so that the coupling components are clearly visible to an occupant of the wheelchair and so that in many cases the occupant can perform the entire coupling operation without assistance. As a result, in many cases, an occupant of the wheelchair can reposition himself or herself and the wheelchair in a vehicle without assistance. Further, when the lift assembly and a vehicle in which it is mounted are adapted for installing the wheelchair in place of the drivers seat of the vehicle, in many cases it is possible for an occupant of the wheelchair to operate the wheelchair, the lift assembly and the vehicle without assistance.

Accordingly, it is a primary object of the instant invention to provide an effective collapsible wheelchair.

Another object of the instant invention is to provide an effective and efficient wheelchair lift assembly which is operable in combination with an automobile.

A still further object of the instant invention is to provide a collapsible wheelchair including a chair member and a pair of enlarged rear wheels wherein one of the rear wheels of the wheelchair is repositionable beneath the seat portion of the chair member and the other rear wheel is repositionable behind the back portion of the chair member.

An even further object of the instant invention is to provide a wheelchair lift assembly comprising a vertical column member, a pivot arm on the column member and a lift mechanism for vertically repositioning the arm with respect to the column member, wherein the column member is adapted to be mounted in a substantially vertical disposition substantially along the longitudinal center line of the vehicle.

Still another object of the instant invention is to provide a collapsible wheelchair and a lift assembly which can in many cases be operated without assistance by an occupant of the wheelchair for repositioning the wheelchair and the occupant in a vehicle.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention;

FIG. 10 is a rear elevational view of the lift assembly;

FIG. 11 is a top plan view of the anchor unit portion of the lift assembly in an unlocked position;

FIG. 12 is a similar view with the anchor unit in a locked position;

DESCRIPTION OF THE INVENTION

Figure 1:
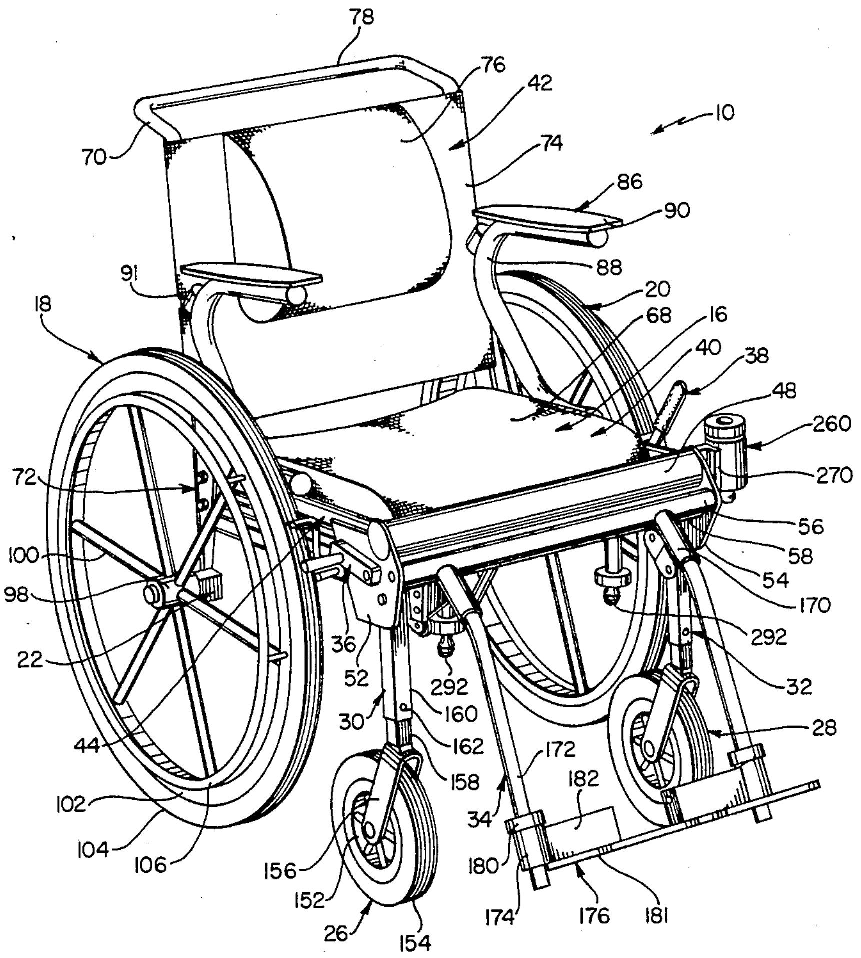
FIG. 1 is a perspective view of the collapsible wheelchair of the subject invention.

Referring now to the drawings, the collapsible wheelchair of the instant invention is illustrated and generally indicated at 10 in FIGS. 1–7 and 18–20, and the lift assembly of the instant invention is illustrated and generally indicated at 12 in FIGS. 10 and 18–20. The wheelchair 10 is alternatively positionable in the operative position illustrated in FIGS. 1 and 2 and the collapsed position illustrated in FIGS. 6 and 7, and the lift assembly 12 is adapted to be permanently installed in an automobile 14 in the manner illustrated in FIGS. 18–20. When the wheelchair 10 is in the collapsed position thereof, the lift assembly 12 is operable for moving the wheelchair 10 between the position illustrated in FIG. 18 wherein the wheelchair 10 is disposed on the exterior of the automobile 14 and the position illustrated in FIG. 20, wherein the wheelchair 10 is disposed in the interior of the automobile 14. Further, when an occupant is seated in the wheelchair 10, he or she can be effectively moved between the exterior of the automobile 14 and the interior of the automobile 14 in the wheelchair 10; and when the wheelchair 10 is disposed in the interior of the automobile 14, the occupant can be effectively and comfortably transported while disposed in a normal seating location and position in the automobile 14.

Collapsible Wheelchair

Figure 6:
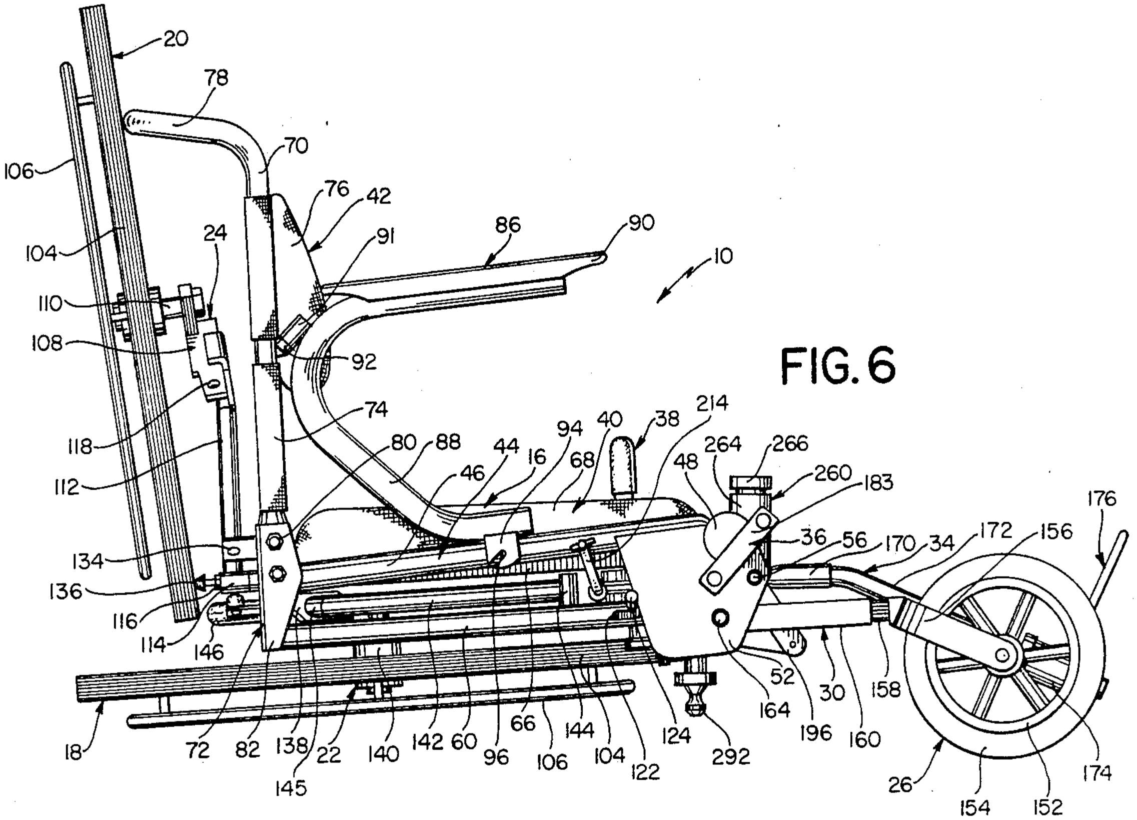
Figure 7:
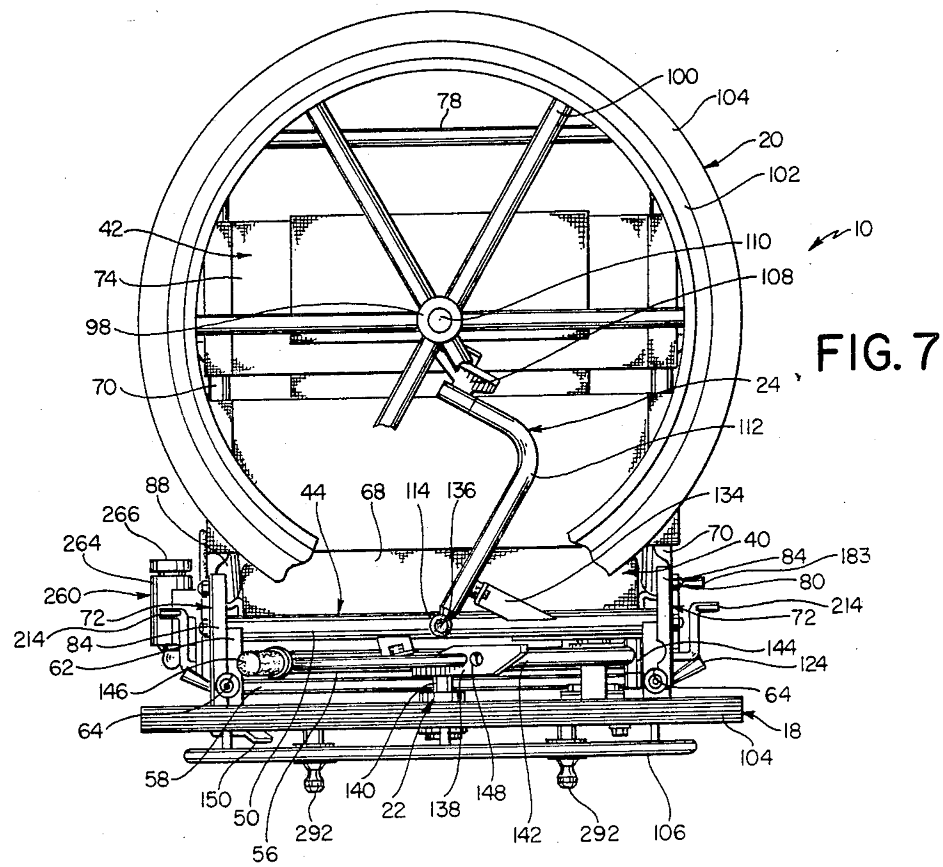

The wheelchair 10 is constructed so that it can be effectively operated in a manner similar to a conventional wheelchair, but so that it is movable to the collapsed position illustrated in FIGS. 6 and 7 to enable the wheelchair 10 to be effectively installed in the vehicle 14. The wheelchair 10 comprises a chair member generally indicated at 16, right and left rear wheels 18 and 20, respectively, which are mounted on the chair member 16 with right and left rear wheel mounting assemblies generally indicated at 22 and 24, respectively, right and left front wheels 26 and 28, respectively, which are mounted on the chair member 16 with right and left front wheel mounting assemblies 30 and 32, respectively, a footrest assembly generally indicated at 34 which is mounted on the chair member 16, a crank assembly generally indicated at 36 and a break assembly generally indicated at 38. The chair member 16 comprises seat and back portions generally indicated at 40 and 42, respectively, and the right and left rear wheel mounting assemblies 22 and 24, respectively, are adapted for mounting the rear wheels 18 and 20, respectively, on the chair member 16 so that they are movable between the operative positions thereof illustrated in FIGS. 1 and 2, wherein the rear wheels 18 and 20 are positioned adjacent opposite sides of the seat portion 40 and the collapsed positions thereof illustrated in FIG. 6. In particular, the right rear wheel mounting assembly 22 is adapted for mounting the right rear wheel 18 so that it is movable to a collapsed position wherein it is disposed beneath the seat portion 40 and positioned in substantially parallel relation therewith, and the left wheel mounting assembly 24 is adapted for mounting the left rear wheel 20 so that it is movable to a collapsed position wherein it is disposed behind the back portion 42 and positioned in substantially parallel relation therewith. The front wheel mounting assemblies 30 and 32 are adapted for mounting the right and left front wheels 26 and 28, respectively, on the chair member 16 so that they are movable between the downwardly disposed operative positions illustrated in FIGS. 1, 2 and 8 for operating the wheelchair 10 in a conventional manner on a supporting surface and the elevated positions thereof illustrated in FIGS. 6 and 9, and the footrest assembly 34 is adapted so that it is movable between the downwardly extending first position illustrated in FIGS. 1, 2 and 8 and the raised second position illustrated in FIGS. 6 and 9. The crank assembly 36 is operative for mechanically moving the wheels 26 and 28 and the footrest assembly 34 between the downwardly disposed positions thereof and the raised positions thereof, and the brake assembly 38 is operative for breaking the rotation of the wheels 18 and 20.

The seat portion 40 of the chair member 16 is illustrated in FIGS. 1–7, and it comprises a rigid main frame generally indicated at 44 comprising a pair of spaced tubular side frame members 46, an enlarged tubular front frame member 48 which is welded to the forward ends of the side frame members 46, and a tubular rear frame member 50 which extends integrally between the rear ends of the side frame members 46. Right and left front side plates 52 and 54, respectively, are welded to the right and left side frame members 46, respectively, adjacent the front ends thereof, and the plates 52 and 54 are also welded to the front frame member 48. A cross member 56 is rotatably secured to the plates 52 and 54 so that it extends therebetween in substantially parallel relation with the front frame member 48, and a second cross member 58 is welded to the plates 52 and 54 in substantially parallel relation with the front frame member 48. A pair of tubular lower side frame members 60 are welded to the front cross member 58 and to the plates 52 and 54 and extend rearwardly in downwardly spaced relation to the side frame members 46 on opposite sides of the seat portion 40. Rearwardly facing end plates 62 (illustrated in FIGS. 2, 7, 16 and 17) are welded to the rear ends of the side frame members 46 and 60 to structurally interconnect the adjacent side frame members 46 and 60 on the opposite sides of the seat portion 40, and rearwardly facing apertures 64 are formed in the end plates 62 so that they communicate with the interiors of the tubular side frame members 60 for reasons which will hereinafter be set forth. The seat portion 40 further comprises a seat pan 66 which is assembled in the tubular frame 44 and secured thereto so that it extends across the open interior of the frame 44 to provide a structure for supporting an occupant of the seat portion 40, and a seat cushion 68 of conventional construction is assembled in the seat pan 66 to provide a cushioned seat for an occupant of the wheelchair 10.

Figure 2:
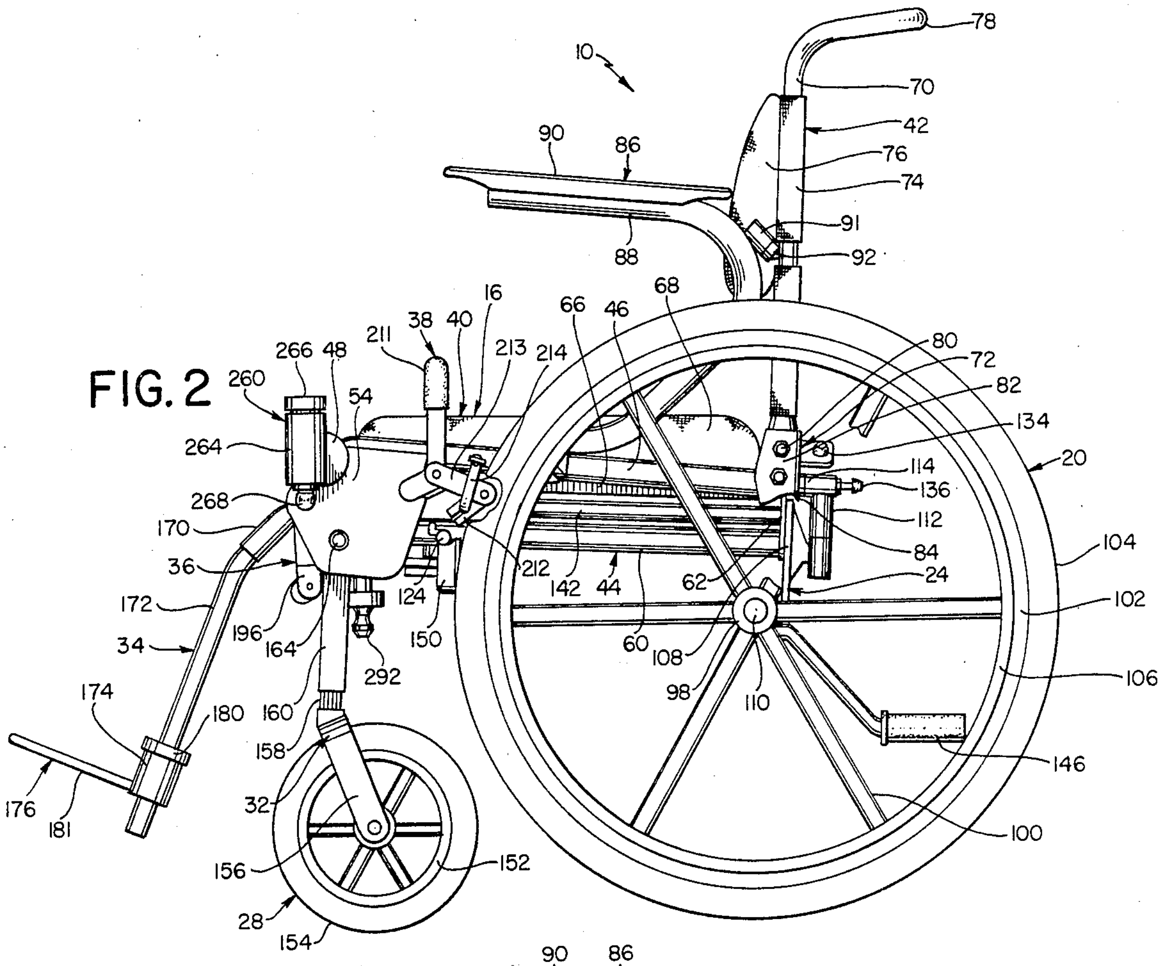
FIG. 2 is a side elevational view thereof.
Figure 3:
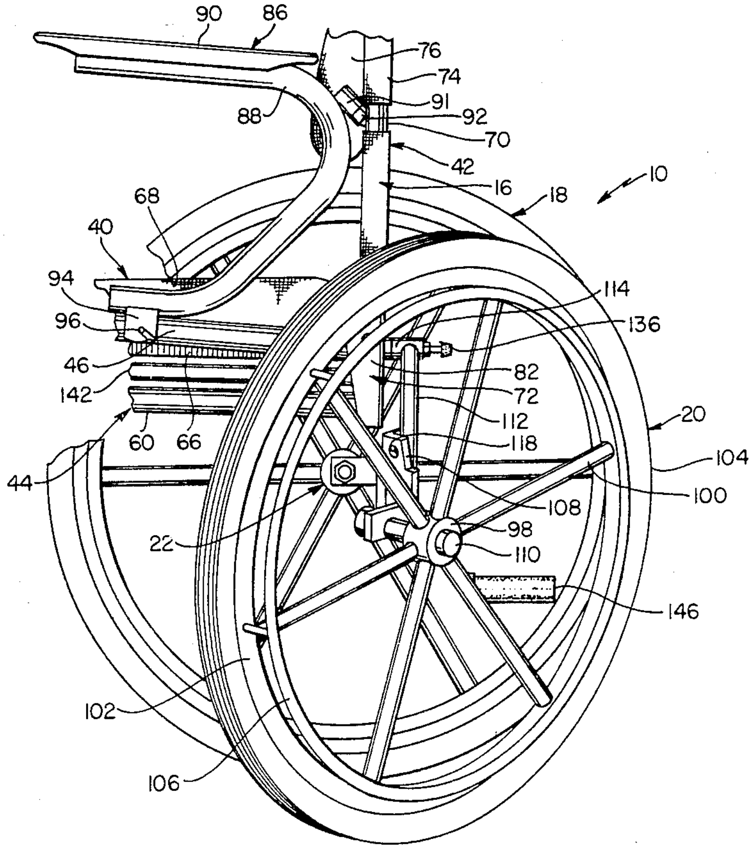
FIGS. 3–7 are sequential views of the wheelchair as the rear wheels are moved to the collapsed positions thereof.
Figure 4:
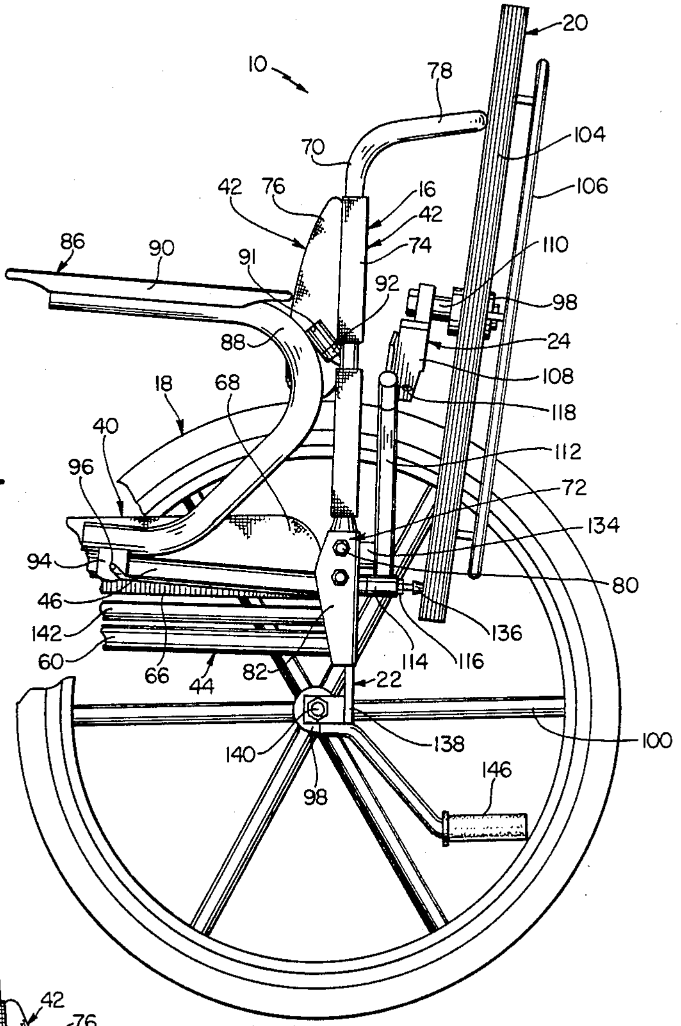
Figure 16:
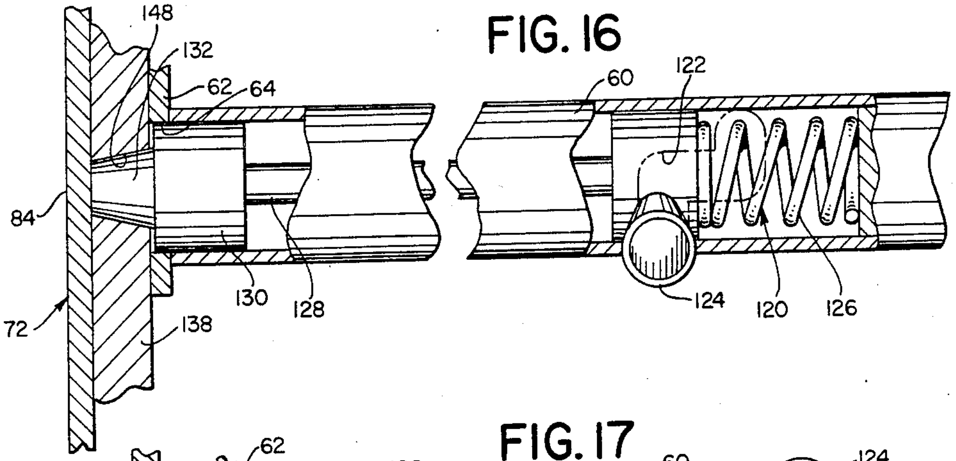
FIG. 16 is a fragmentary sectional view of the rear wheel locking pin mechanism in a locked position.
Figure 17:
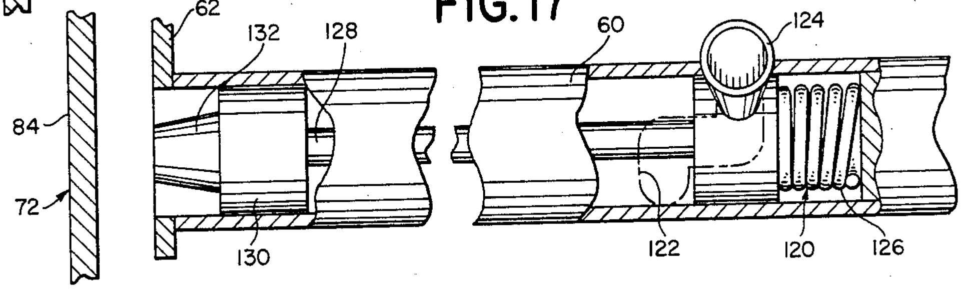
FIG. 17 is a similar view with the locking pin mechanism in an unlocked position.

The back portion 42 of the chair member 16 comprises an integrally formed tubular back frame member 70, a pair of rear corner brackets 72, a fabric back piece 74, and a seat back cushion 76. The back frame member 70 is formed to define an upwardly extending frame of generally inverted U-shaped configuration for the seat back 42, and it includes a rearwardly bent handlebar portion 78 at the upper end thereof. The opposite terminal ends of the back frame member 70 are formed in collapsed dispositions, and they are secured in the brackets 72 with bolts 80. The rear corner brackets 72 are formed as angle brackets and they include side portions 82 illustrated in FIGS. 4 and 6 and rear portions 84 illustrated in FIG. 7. The corner brackets 72 are welded to the respective adjacent side frame members 46 and 60, and they are positioned so that the rear portions 84 thereof are rearwardly spaced slightly from their respective adjacent rear end plates 62 as illustrated in FIGS. 2, 16 and 17. The back piece 74 is of flexible construction and extends transversely across the back portion 42 between the vertical portions of the frame member 70, and the seat back cushion 76 is attached to the back piece 74.

The chair member 16 further comprises a pair of detachable arm pieces generally indicated at 86. The arm pieces 86 each comprise a tubular arm frame piece 88 and an upper arm pad 90, and they are mounted in the chair member 16 so that the arm pads 90 are operable for supporting the arms of an occupant of the wheelchair 10. Provided on the rearmost portions of the arm frame members 88 are female sleeves 91 which are detachably received and frictionally retained on male members 92 which are welded to the seat back frame 70. Notched attachment plates 94 are welded on the lower portions of the arm frame pieces 88, and pins 96 which extend outwardly and upwardly from the side frame pieces 46 are received in the notches in the attachment plates 94 to releasably retain the lower portions of the arm pieces 86 on the frame 44. Accordingly, the arm pieces 86 are independently removable from the seat portion 40 and the back portion 42 by moving them upwardly and forwardly, although they are normally retained on the seat portion 40 and the back portion 42.

The right and left rear wheels 18 and 20 preferably comprise conventional wheels of enlarged diameter (preferably approximately 24 inches) such as often found on conventional wheelchairs, and they each include a center hub 98, a plurality of radial spokes 100, an outer rim 102, a rubberized tread 104 and a hand ring 106. The hand rings 106 are of slightly smaller diameter than the rims 102, and they are concentrically mounted in outwardly spaced relation on the rims 102. The hand rings 106 are adapted for providing a convenient means for an occupant of the wheelchair 10 to rotate the wheels 18 and 20 in order to thereby propel the wheelchair 10 on a supporting surface in a manner similar to a conventional wheelchair.

Referring next to FIGS. 2–7, the left rear wheel mounting assembly 24 is more clearly illustrated. In this regard, it should be recognized that in order to move the wheelchair 10 to the collapsed position thereof wherein the rear wheels 18 and 20 are positioned beneath and behind the chair member 16, respectively, the left rear wheel 20 must be moved to the collapsed position thereof first before the right wheel 18 is moved to the collapsed position thereof in order to provide sufficient clearance for the right rear wheel 18 beneath the seat portion 40. The left rear wheel mounting assembly 24 is operative for mounting the left rear wheel 20 so that it is movable between the operative position thereof illustrated in FIG. 2 wherein it is disposed adjacent the left side of the chair member 16 and operative for movably supporting the left rear portion of the chair member 16, and the collapsed position thereof illustrated in FIGS. 4–7 wherein it is disposed behind the back portion 42 of the chair member 16 and positioned in substantially parallel relation with the back portion 42. The mounting assembly 24 comprises a wheel bracket 108 having a wheel shaft 110 thereon, an elbow arm 112 having a pivot sleeve 114 attached thereto, and a pivot shaft 116 which is welded to the rear frame member 50 so that it extends rearwardly therefrom. The wheel 20 is rotatably mounted on the wheel shaft 110 in a conventional manner, and the wheel bracket 108 is mounted on the elbow arm 112 adjacent one end thereof so that it is rotatable about the axis of the adjacent portion of the elbow arm 112. The opposite end of the elbow arm 112 is secured to the sleeve 114 in substantially perpendicular relation, and the elbow arm 112 is formed with a substantially right angle bend therein as illustrated in FIG. 7. The sleeve 114 is rotatably secured on the shaft 116, and the elbow arm 112 is attached to the sleeve 114 so that it is substantially contained in a plane which is perpendicular to the axis of the shaft 116 and so that the elbow arm 112 is rotatable in the same plane about the axis of the pivot shaft 116. Accordingly, the wheel bracket 108 and the sleeve 114 are rotatable about two independent nonintersecting axes which are approximately perpendicular to each other to enable the wheel 20 to be effectively moved between the operative and collapsed positions thereof. The wheel mounting assembly 24 is further constructed so that when the wheel 20 is in the operative position thereof, the bracket 108 is received in the left rear frame bracket 72 and secured therein between the rear portion 84 of the bracket 72 and the adjacent rear end plate 62 as illustrated in FIG. 2. In this regard, as illustrated in FIGS. 3–6, an aperture 118 is provided in the bracket 108; and the mounting assembly 24 is constructed so that when the wheel 20 is in the operative position thereof, the aperture 118 is substantially aligned with the apertures 64 in the adjacent rear end plate 62 so that the aperture 118 in the bracket 108 is aligned with the tubular interior of the adjacent lower side frame member 60.

The left wheel mounting assembly 24 further comprises a locking pin assembly 120 which is operative for releasably securing the left wheel mounting assembly 24 in a position wherein the left wheel 20 is disposed in the operative position thereof. In this regard, reference is made to FIGS. 16 and 17 wherein a locking pin assembly 120 which comprises part of the right wheel mounting assembly 22 is illustrated, it being understood that the right locking pin assembly 120 is of reverse orientation so that it is, in effect, a mirror image of the left locking pin assembly 120. As will be seen, the lower side frame members 60 of the seat frame 44 have two-position guide slots 122 formed therein, and the locking pin assemblies 120 comprise actuator pins 124 which extend outwardly from the guide slots 122 thereof and are biased by springs 126 and adapted to be repositioned in the slots 122 thereof. Attached to the actuator pins 124 are elongated locking rods 128 having tapered terminal locking pins 132 thereon. The locking pin assemblies 120 are operative between retracted positions wherein the locking pins 132 thereof are retracted into the tubular side frame members 60 thereof and locked positions wherein the pins 132 project beyond the ends of the tubular side frame members 132 and through the apertures 64 in the adjacent rear plates 62.

Referring again more specifically to the left wheel mounting assembly 24, when the wheel 20 is in the operative position thereof, the left locking pin 132 normally projects into the aperture 118 in the bracket 108 to retain the bracket 108 in the left rear corner bracket 72 and to thereby releasably retain the left wheel 20 in the operative position thereof. However, by repositioning the left actuator pin 124 in the left slot 122 thereof, the left locking pin 132 can be retracted from the aperture 118 to enable the left wheel 20 to be pivoted to the collapsed position thereof. As soon as the left locking pin 132 has been removed from the aperture 118, the arm 112 is free to pivot downwardly and inwardly to remove the bracket 108 from the left corner bracket 72, and thereafter the left wheel 20 can be moved to the collapsed position thereof by pivoting the elbow arm 112 about the axis of the shaft 116 and further pivoting the bracket 108 about the axis of the adjacent portion of the arm 112 until the left wheel 20 is positioned behind the seat back portion 42. In this regard, a stop 134 is provided on the rear cross frame member 50 for engaging the elbow arm 112 to prevent it from pivoting beyond a position wherein the wheel 20 is substantially aligned with the seat back 42, and a wedge stop 136 extends rearwardly from the shaft 116 for engaging the tread 104 of the wheel 20 to force the wheel 20 against the handlebar portion 78 of the seat back frame 70 in order to releasably retain the wheel 20 in the collapsed position thereof.

Figure 5:
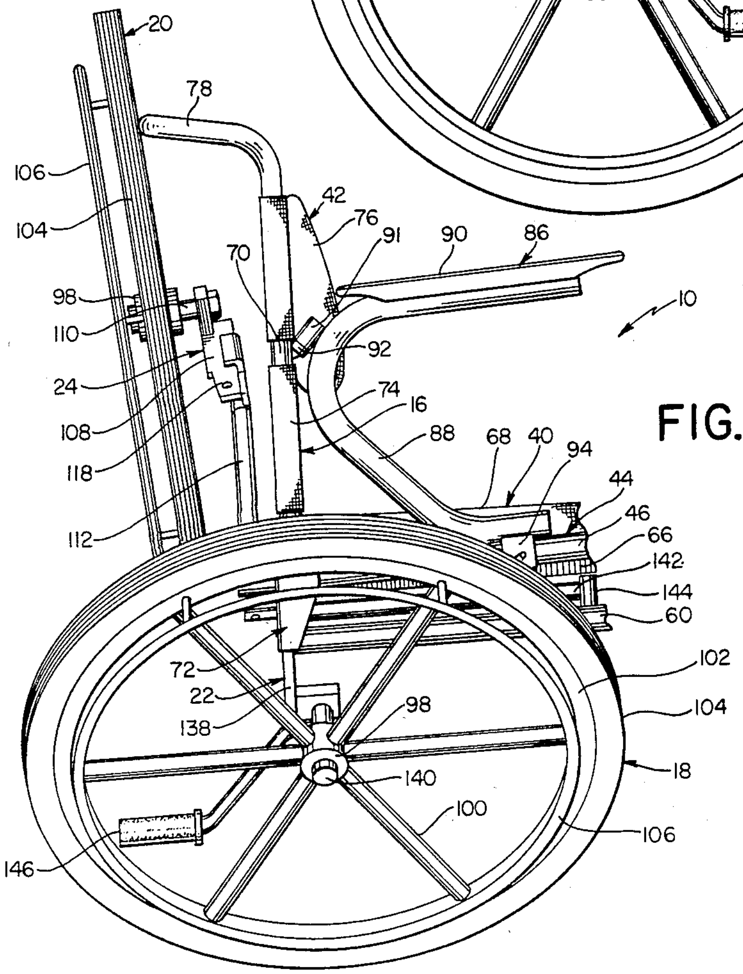

The right rear wheel mounting assembly 22 is illustrated most clearly in FIGS. 5–7, and it is operative for mounting the right rear wheel 18 so that it is movable between the operative position thereof illustrated in FIGS. 1–4 and the collapsed position thereof illustrated in FIGS. 6 and 7 wherein it is disposed beneath the seat portion 40. The right rear wheel mounting assembly 22 comprises a wheel bracket 138 from which a wheel shaft 140 extends, and a pivot arm 142 which is attached to a pivot post 144. The pivot post 144 is preferably welded to the inner side of the lower right side frame member 60, and it is operative for mounting the pivot arm 142 so that it is pivotable in a substantially horizontal plane beneath the seat portion 40. The pivot arm 142 extends rearwardly from the post 144, and the bracket 138 is welded to a sleeve 145 which is rotatably mounted on an axial pin (not shown) attached to the rear end of the pivot arm 142 so that the bracket 138 is pivotable about the axis of the pivot arm 142. The right wheel 18 is mounted on the shaft 140, and a foot pedal 146 is rigidly attached to the bracket 138 so that it extends rearwardly and downwardly therefrom when the right wheel 20 is in the operative position thereof as illustrated. An aperture 148 is provided in the bracket 138; and, the right locking pin assembly 120 illustrated in FIGS. 16 and 17 is provided for releasably securing the right rear wheel 18 in the operative position thereof. In this regard, when the right rear wheel 18 is in the operative position thereof, the bracket 138 is received in the right rear corner bracket 72 so that it is positioned between the rear portion 84 thereof and the adjacent rear end plate 62 and so that the aperture 148 is substantially aligned with the aperture 64 in the adjacent rear end plate 62. When the right locking pin assembly 120 is in the locked position thereof, the tapered pin 132 projects into the aperture 148 to lock the right wheel 18 in the operative position thereof. However, when the pin 132 is retracted from the aperture 148, the right wheel 18 is free to swing inwardly as the bracket 138 is pivoted on the pivot rod 142. Further, by pivoting the right wheel 18 to a substantially horizontal disposition and swinging the pivot rod about the axis of the pivot post 144, the right wheel 18 can be moved to a substantially aligned position beneath the chair portion 40. A shelf 150 extends downwardly from the front portion of the lower left side frame member 60 for supporting the wheel 18 in the collapsed position thereof.

The front wheels 26 and 28 are preferably also of conventional construction, and they comprise wheel portions 152 and rubberized tread portions 154.

Figure 8:
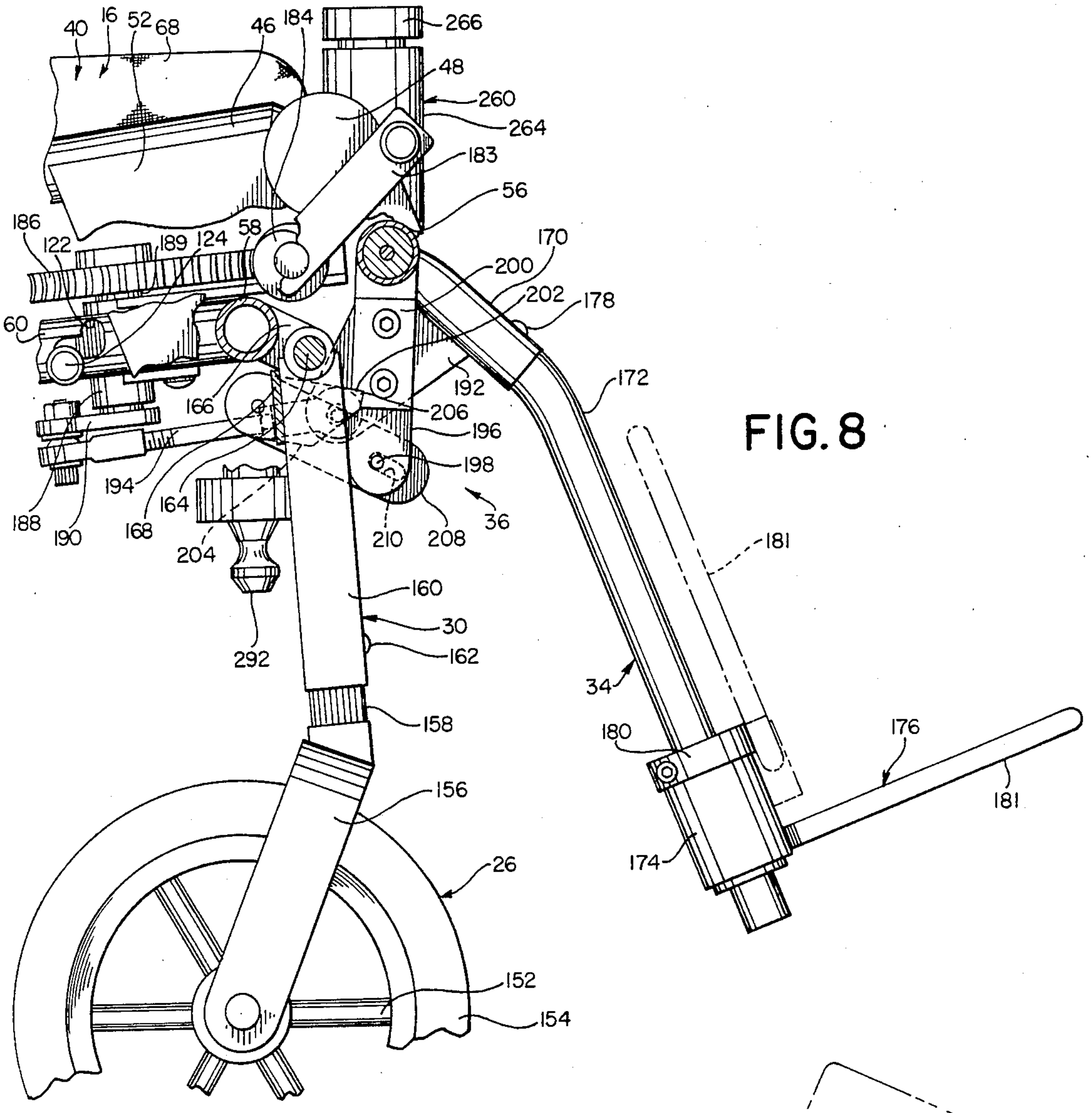
FIG. 8 is a fragmentary side elevational view of the front portion of the wheelchair with the front wheels and the foot support in the downwardly extending positions thereof.
Figure 9:
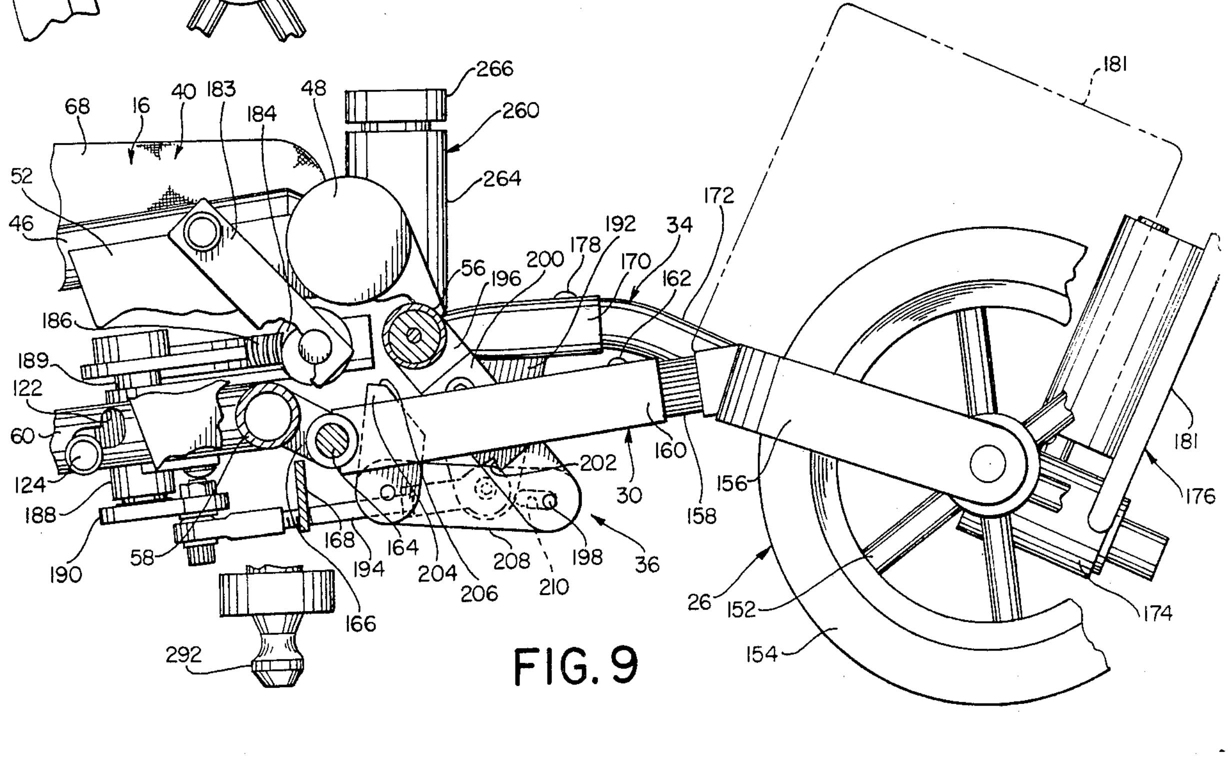
FIG. 9 is a similar view with the front wheels and the foot support in the raised positions thereof.
Figure 13:
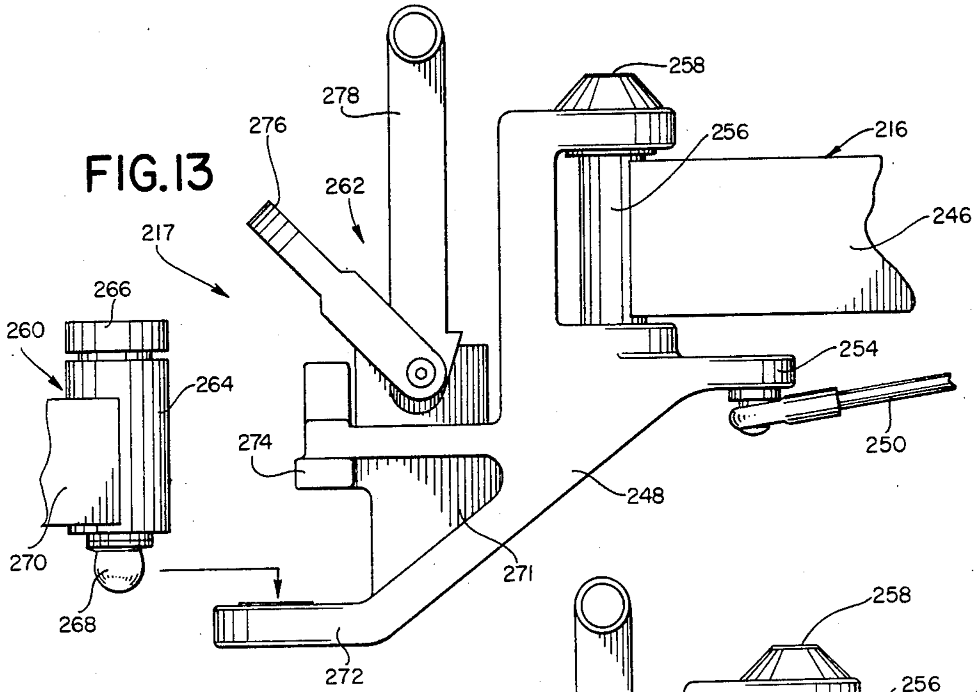
FIGS. 13–15 are sequential views of the coupling assembly as it is moved from an unlocked position to a locked position.
Figure 14:
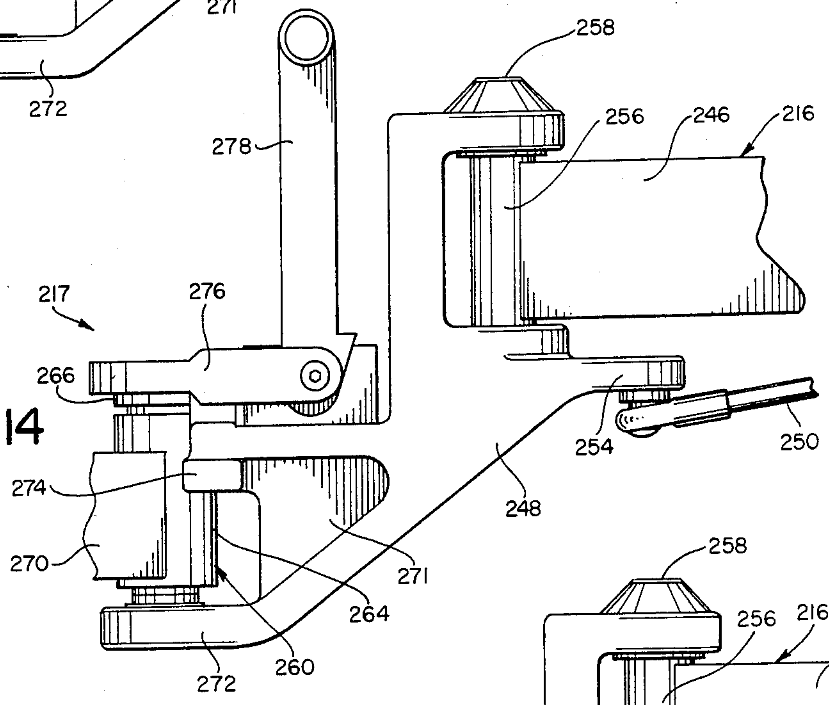
Figure 15:
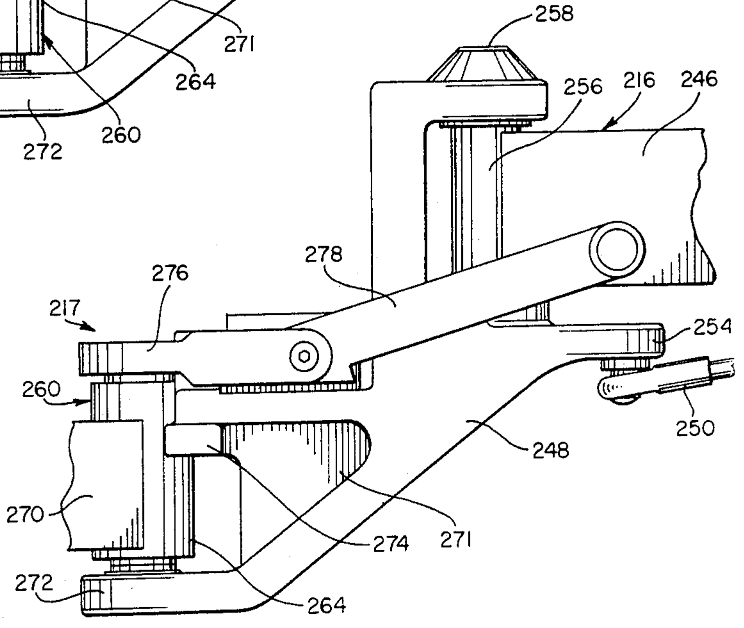

The right and left front wheel mounting assemblies 30 and 32 are of substantially identical construction and in connection therewith reference is made to FIGS. 8 and 9 where the right front wheel mounting assembly 30 is most clearly illustrated. As will be seen, the front wheel mounting assemblies 30 and 32 are operative for mounting the front wheels 26 and 28, respectively, so that they are movable between the operative positions thereof illustrated in FIG. 8 and the raised or collapsed positions thereof illustrated in FIG. 9. The front wheel mounting assemblies 30 and 32 comprise wheel fork pieces 156 in which the wheels 26 and 28 are mounted, lower column pieces 158 and upper column pieces 160. The fork pieces 156 are mounted on the lower column pieces 158 so that they are pivotable about the axes of their respective lower column pieces 158. The lower and upper column pieces 158 and 160 preferably have substantially square cross sections, and the lower column pieces 158 are preferably received in the upper column pieces 160, and pins 162 are provided for securing the lower column pieces 158 in the upper column pieces 160. The upper ends of the upper column pieces 160 are pivotably secured on pivot shafts 164 and the pivot shafts 164 are mounted between mounting arms 166 which are welded to the front crossbar 58 and the adjacent front side plates 52 and 54. Stop pieces 168 are welded to the inner sides of the front side plates 52 and 54, and extend inwardly for limiting the rearward pivotal movement of the mounting assemblies 30 and 32 as illustrated in FIG. 8.

The foot support assembly 34 is mounted on the front cross member 56 so that it is movable between the downwardly extending position illustrated in FIGS. 1, 2 and 8, and the elevated or raised position illustrated in FIGS. 6 and 9 by rotating the cross member 56. The foot support assembly 34 comprises a pair of female socket members 170 which are welded to the cross member 56, a pair of tubular frame pieces 172 which are received in the socket members 170, a pair of pivot members 174 which are received on the frame members 172 adjacent the outer ends thereof, and a pair of foot support members 176 which are attached to the pivot members 174. The frame members 172 are releasably secured in the female socket members 170 with pins 178, and the pivot members 174 are secured on the frame members 172 with collars 180. The foot support members 176 are of generally L-shaped configuration, and they include foot pads 181 which are adapted to engage the bottom surfaces of the feet or shoes of an occupant of the wheelchair 10 and back plates 182 which are disposed in substantially perpendicular relation to the foot pads 181 and are adapted to engage the rearwardly facing heel portions of the feet or shoes of the occupant. The back plates 182 are pivotably mounted on the pivot members 174 to enable the foot support members 176 to be pivoted upwardly about axes which are substantially perpendicular to the frame members 172, and the pivot members 174 are adapted to enable the foot support members 176 to be pivoted outwardly about the axes of their respective frame members 172.

The crank assembly 36 is illustrated most clearly in FIGS. 8 and 9, and it is operative for simultaneously moving the wheel mounting assemblies 30 and 32 and the foot support assembly 34 to the raised positions thereof. The crank assembly 36 comprises a crank handle 183 which is rotatably mounted on the right front side plate 52, a worm gear 184 which is rotatably mounted on the chair frame 44, a worm wheel 186 which is mounted in a pillow block 188 attached to the chair frame 44, and a bell crank 190. The crank handle 183 is mounted on the end of the worm gear 184 so that it is operable for rotating the worm gear 184, and the worm gear 184 is mounted so that it communicates with the worm wheel 186 to effect rotation of the worm wheel 186 when the crank handle 183 is rotated. The worm wheel 186 is mounted on a shaft 189 which extends through the pillow block 188, and the bell crank 190 is mounted on the shaft 189 so that it rotates with the worm wheel 186. The crank assembly 36 further comprises a triangular arm 192 which is welded to the back side of the right-hand socket piece 170 of the foot support assembly 34, and a connecting rod 194 is pivotably attached to the bell crank 190 and the outer portion of the arm 192. Accordingly, when the crank handle 183 is rotated to rotate the worm gear 184, the worm wheel 186 and the bell crank 190, the connecting rod 194 operates to pivot the foot support assembly 34 about the axis of the cross member 56 to raise or lower the foot support assembly 34 depending on the direction of rotation of the crank handle 183. The right triangular arm 192 is also mechanically interconnected to the wheel mounting assembly 30 for simultaneously pivoting the wheel mounting assembly 30 with the foot support assembly 34. In this regard, a right first lever arm 196 is welded to the cross member 56 so that it rotates therewith, and a pin 198 extends outwardly from the plane of the first lever arm 196 adjacent the terminal end thereof. A right raised plate 200 having a notch 202 therein is secured on the right first lever arm 196, and a right second lever arm 204 (illustrated in FIG. 9) is welded to the side of the right upper column piece 160 and it includes a tapered end 206 which projects outwardly beyond the right upper column piece 160. Pivotably connected to the lever arm 204 at the end thereof which is opposite from the tapered end 206 is a right connector arm 208 having an elongated slot 210 therein, and the pin 198 is received in the slot 210 to connect the right first lever arm 196 to the right second lever arm 204. Accordingly, when the crank handle 183 is rotated to pivot the foot support assembly 34, the right first lever arm 196 is pivoted about the axis of the cross member 46, and pivotal movement is communicated from the right first lever arm 196 to the right wheel mounting assembly 30 through the right pin 198, the right connector arm 208 and the right second lever arm 204. In particular, when the crank handle 183 is rotated to raise the wheel mounting assembly 30 and the foot support assembly 34, the pin 198 travels in the slot 210 until it reaches the outer end thereof whereupon it moves the connector arm 208 forwardly to pivot the right wheel mounting assembly 30 upwardly. On the other hand, when the crank handle 183 is rotated to lower the right wheel mounting assembly 30 and the foot support assembly 34, the weight of the right wheel 26 and the right wheel mounting assembly 30 causes the pin 198 to engage the outer end of the slot 210 until the right wheel mounting assembly 30 is in an operative position wherein the column piece 160 engages the stop member 68 to prevent the right wheel mounting assembly 30 from being pivoted further downwardly. Once the column piece 160 engages the stop member 68, if the crank handle 183 is rotated further to pivot the foot support assembly 34 downwardly further, the pin 198 travels to the inner or rear end of the slot 210, and the right first lever arm 196 is moved so that the tapered end 206 of the right lever arm 204 is received in the notch 202 to lock the foot support assembly 34 against further rearward or downward movement.

While the foot support assembly 34 is constructed so that it pivots as a single unit on the cross member 56 in response to rotation of the crank handle 183, the front wheel mounting assemblies 30 and 32 are independently pivotably mounted on the frame 44, and therefore a separate connecting structure (not shown) which is similar to that hereinabove described, is provided in the crank assesmbly 36 for raising and lowering the left wheel mounting assembly 32. In this regard, a left first lever arm 196 having a left raised plate 200 thereon is welded to the cross member 56. A left second lever arm 206 is welded to the left upper column piece 160, a left connector arm 208 extends between the left first lever arm 196 and the left second arm 204, and a left stop 168 is provided on the left front side plate 54. Accordingly, when the crank handle 183 is rotated to raise or lower the foot support assembly 34 and the right wheel mounting assembly 30, corresponding movement is communicated to the left wheel mounting assembly 32 through the rotatable cross member 56, the left first lever arm 196, the left pin 198, the left connecting arm 208 and the left second lever arm 204.

The brake assembly 38 is of conventional construction; and, as illustrated in FIG. 2, it includes a handle 211 which is pivotably mounted on the left front side plate 54, and a pivotably mounted left lever arm 212 which is connected to the handle 211 with a connector arm 213. A left braking element 214 is attached to the left lever arm 212 so that it pivots therewith to engage the adjacent left tread portion 104 when the handle 211 is pivoted rearwardly. The left braking element 214 is integrally formed with a rod (not shown) which extends to the right side of the seat portion 40 and through the right front side plate 52, and a right braking element 214 is integrally attached to the rod so that it pivots with the left braking element 214 to engage the right tread portion 104.

Lift Assembly

Figure 18:
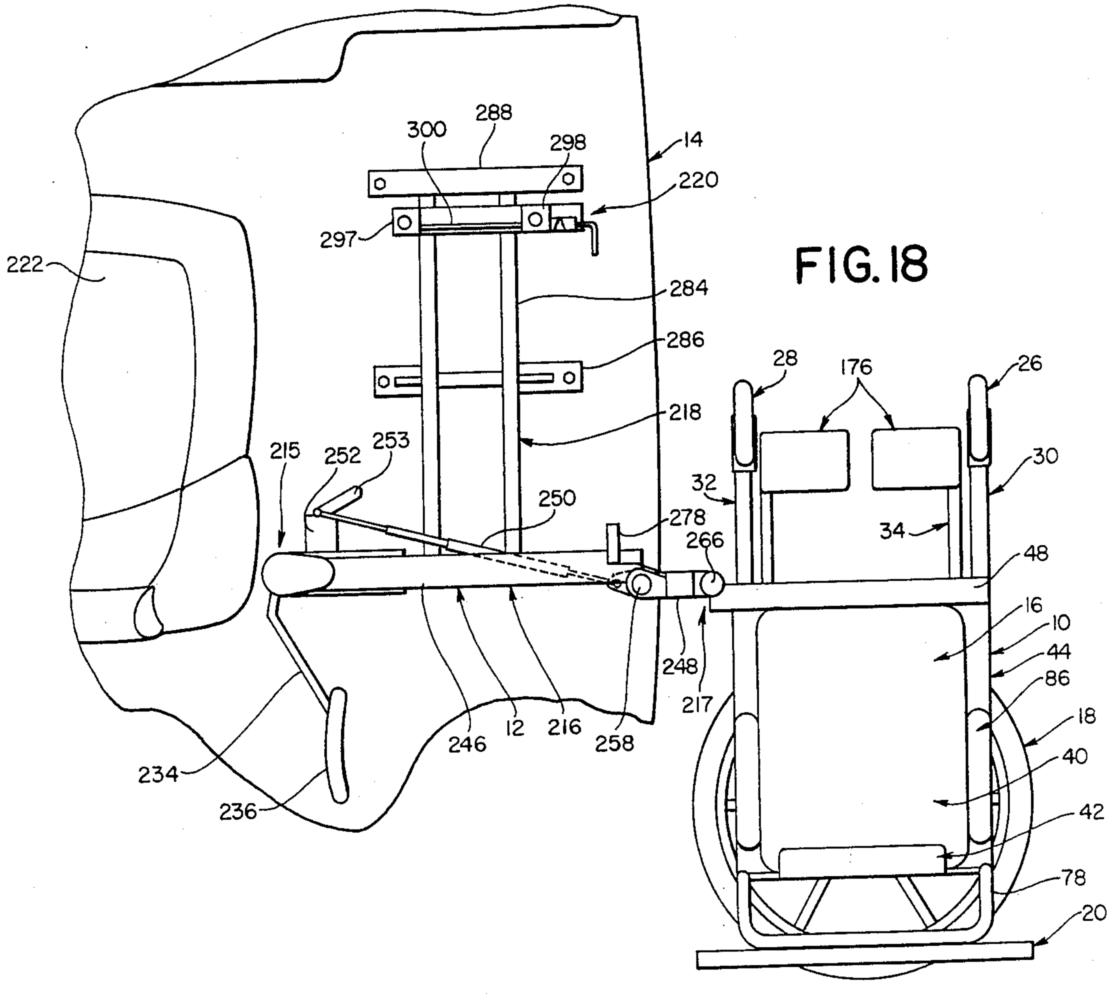
FIGS. 18–20 are sequential views of the wheelchair and the lift assembly as the wheelchair is installed in a vehicle.
Figure 20:
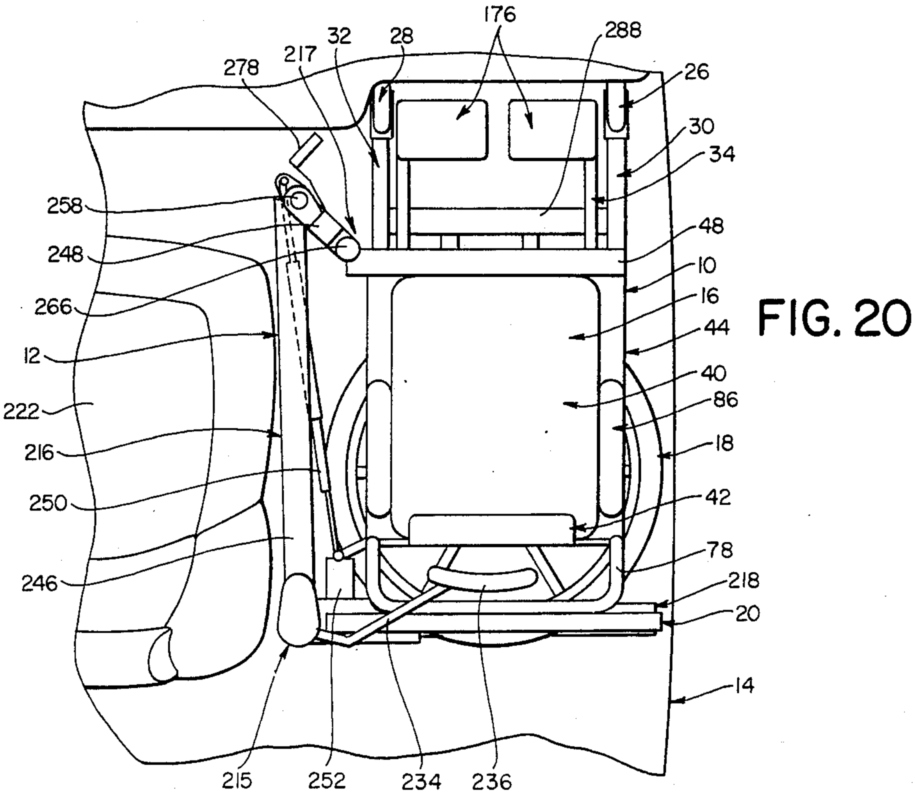

The lift assembly 12 is adapted to be mounted in a vehicle such as the automobile 14 so that it is operative for moving the wheelchair 10 or another suitably adapted chair member between the position illustrated in FIG. 18 wherein it is disposed on the exterior of the automobile 14 and the position illustrated in FIG. 20 wherein it is disposed in the interior of the automobile 14 and secured in a position normally occupied by a conventional bucket-type seat therein. The lift assembly 12 comprises a column assembly generally indicated at 215, and an arm assembly generally indicated at 216, a coupling assembly generally indicated at 217, a base assembly generally indicated at 218, and a locking assembly generally indicated at 220. The arm assembly 216 is attached to the column assembly 215 so that it extends substantially perpendicularly outwardly therefrom, and it is pivotable about the axis of the column assembly 215 and vertically repositionable by means of the column assembly 215. The coupling assembly 217 is operative for coupling the wheelchair 10 to the outer end of the arm assembly 216, and the base assembly 218 is attached to the lower end of the column assembly 215 and adapted for mounting the lift assembly in a vehicle, such as the automobile 14. The locking assembly 220 is operative for anchoring the wheelchair 10 on the base assembly 218. For use of the lift assembly 12, one of the seats of a vehicle such as the automobile 14 is first removed, and the lift assembly 12 is permanently installed in the vehicle so that the column assembly 215 is disposed in a substantially vertical disposition along the longitudinal center line of the vehicle. In this regard, in the specific example herein set forth, the automobile 14 is originally equipped with bucket-type seats to enable one of the seats thereof to be easily removed; although it will be understood that vehicles which are originally equipped with other types of seats can also be adapted to accommodate the lift assembly 12. Further, while in the specific example herein set forth, the front right passenger seat of the automobile 14 is removed to accommodate the wheelchair 10 so that it is positioned adjacent a driver seat 222 therein, it will be understood that the lift assembly 12 is readily adaptable to be installed for use in combination with various other seats to meet the needs of various specific applications. It will also be understood that the lift assembly 12 can be utilized in combination with other types of chair members, including nonwheelchair-type chair members, to assist persons to enter into and exit from vehicles.

The column assembly 215 comprises a main column member 224, an outer housing 226, a motor 228, an outer cam plate 230, a cover 232, a headrest arm 234 and a headrest 236. The outer cam plate 230 is mounted on the base assembly 218, and it extends partially around the lower portion of the column member 224. The arm assembly 216 is attached to the lower portion of the column member 224, and the housing 226 is mounted on the column member 224 so that it encloses the upper portion thereof. The motor 228 is mounted in the housing 226, and the motor 228 and the column member 224 are preferbly embodied as a conventional linear actuator which is included in the column assembly 215 and energizeable through a power supply in the automobile 14. In this regard, the column member 224 includes an interior threaded shaft (not shown) which is rotatable by means of the motor 228 and a threaded element (also not shown) in which the threaded shaft is received in threaded engagement. The threaded element is supported by the base assembly 218; and accordingly, upon energization of the motor 228, the column member 224 is moved upwardly or downwardly relative to the base assembly 218 and the outer cam plate 230 depending on the direction of rotation of the motor 228. Further, since the housing 226 is mounted on the column member 224, and the motor 228 and the headrest arm 234 are all attached to the housing 226, these elements also move with the column member 224 when the motor 228 is energized. The cover 232 is mounted so that it provides a shielding cover for the motor 228 and the adjacent side portions of the housing 226. The headrest arm 234 is mounted in a fixed position on the upper end of the housing 226 so that it is in substantially perpendicular relation to the arm assembly 216, and the headrest 236 is mounted on the arm 234. The headrest arm 234 is further oriented with respect to the arm assembly 216 so that when the arm assembly 216 is coupled to the wheelchair 10 and the wheelchair 10 is fully installed in the automobile 14, the headrest 236 is disposed slightly above and in front of the handlebar portion 78. The outer cam plate 230 includes an open slotted area 238, and a cam pin 240 is provided on the column member 224 and positioned thereon so that it travels in the slotted area 238. In this regard, the slotted area 238 is provided so that the up-and-down movement of the arm assembly 216 is restricted and can only be effected when the arm assembly 216 is in predetermined rotated positions in order to prevent damage to the wheelchair 10, the automobile 14, and/or the lift assembly 12. A plurality of limiting switches (not shown) are preferably also provided on the column member 224 for deenergizing the motor 228 in a conventional manner when the position of the arm assembly 216 is at predetermined limits which correspond to the slotted area 238. A control cord 242 having a control switch unit 244 attached thereto is connected to the column assembly 215 and is electrically connected to the motor 228 for remotely actuating the lift assembly 212.

The arm assembly 216 is illustrated most clearly in FIGS. 10 and 18–20, and it comprises an elongated main pivot arm 246, an outer pivot arm 248, and a control link 250. The main pivot arm 246 is attached to the column member 224 so that it is rotatable therewith about the axis of the column member 224. The main arm 246 is of heavy duty construction to enable it to be effectively utilized for supporting the weight of the wheelchair 10 as well as the weight of an occupant thereof. The control link 250 is of telescoping configuration, and it is biased to an expanded position with internal spring means (not shown). One end of the control link 250 is pivotably secured to a post 252 which is part of the base assembly 218 and extends forwardly from the outer cam plate 230 so that it is maintained in a fixed position and does not move with the main arm 246, a rear chair support 253 which is also part of the base assembly 218 extends forwardly and outwardly from the post 252. The opposite end of the control link 250 is pivotably attached to a link arm 254 which extends substantially perpendicularly outwardly from the outer arm 248. A substantially vertical pivot shaft 256 is attached to the outer end of the main arm 246, and the outer arm 248 is attached to the shaft 256 so that it is pivotable about the axis thereof. A conventional fluid-filled level 258 is provided on the upper end of the shaft 256 and is operable for enabling a user of the lift assembly 12 to determine whether or not the arm assembly 216 is in a sufficiently level disposition to be operated in combination with the wheelchair 10. The outer arm 248 is preferably of reduced length, and the arms 246 and 248 are preferably dimensioned so that the combined length thereof is sufficient to enable the outer end of the outer arm 248 to be positioned on the exterior of the automobile 14 in the manner illustrated in FIG. 18.

The coupling assembly 217 is illustrated most clearly in FIGS. 13–15 and 18–20, and it is operative for releasably coupling the outer arm 248 to the wheelchair 10. The coupling assembly 216 comprises a first portion generally indicated at 260 which is permanently attached to the wheelchair 10 and a second portion 262 which is permanently attached to the outer arm 248. The first portion 260 comprises a cylindrical body 264, a cylindrical cap 266, and a rounded ball 268. The cylindrical body 264 is welded to a mount 270 which is in turn welded to the left front side plate 54 of the chair 10 so that the cylindrical body 264 is normally in a substantially vertical disposition. The cap 266 is of substantially the same diameter as the body 264, and it is rotatably mounted in ball bearings (not shown) at the upper end of the body 264; and the ball 268 is rotatably mounted in ball bearings (not shown) at that lower end of the body 264. The second portion 262 comprises a body 271 from which a support or holder portion 272 extends in a substantially horizontal disposition. The holder portion 272 has an upwardly opening socket (not shown) formed therein which is dimensioned for receiving the ball 268 therein, and the second portion 262 further comprises a brace portion 274 which extends outwardly from the body portion 271 and is dimensioned and configured for engaging the cylindrical surface of the body 264 to align the ball 268 with the socket in the holder portion 272. The second portion 262 further comprises an arcuate band 276 and a lever arm 278. The lever arm 278 is pivotably mounted on the body 271, and the band 276 is of elongated configuration and formed so that the opposite ends thereof are joined at the lever arm 278. Specifically, the opposite ends of the band 276 are pivotally attached to the lever arm 278 in an eccentric position so that as the lever arm 278 is pivoted inwardly toward the outer arm 248 the band 276 is drawn inwardly. In this regard, the band 276 is dimensioned and assembled in the second portion 262 so that it is pivotable upwardly to enable the first portion 260 to be assembled with the second portion 262 with the ball 268 received in the socket in the holder portion 272 and with the body portion 264 adjacent the brace portion 274. The band 276 is further dimensioned and configured so that after the first portion 260 has been assembled with the second portion 262 in this manner, the band 276 is receivable over the cap 266, and so that when the lever arm 278 is thereafter pivoted toward shaft 256, the band 276 is drawn into snug engagement with the cap 266. Accordingly, by assembling the first portion 260 in the second portion 262 and moving the lever arm 278 to draw the band 276 around the cap 266, the first and second coupling portions 260 and 262 can be effectively operated to couple the wheelchair 10 to the outer arm 248 so that the wheelchair 10 is pivotable with respect to the outer arm 248 about the substantially vertical axis of the body portion 264. In this regard, the weight of the wheelchair 10 and the overall construction of the coupling assembly 217 cause the body portion 264 to be normally spaced outwardly slightly from the brace portion 274 when the coupling assembly 217 is in a coupled position so that the wheelchair 10 is freely pivotable as a result of the rotatable cap 266 and the rotatable ball 268.

Figure 19:
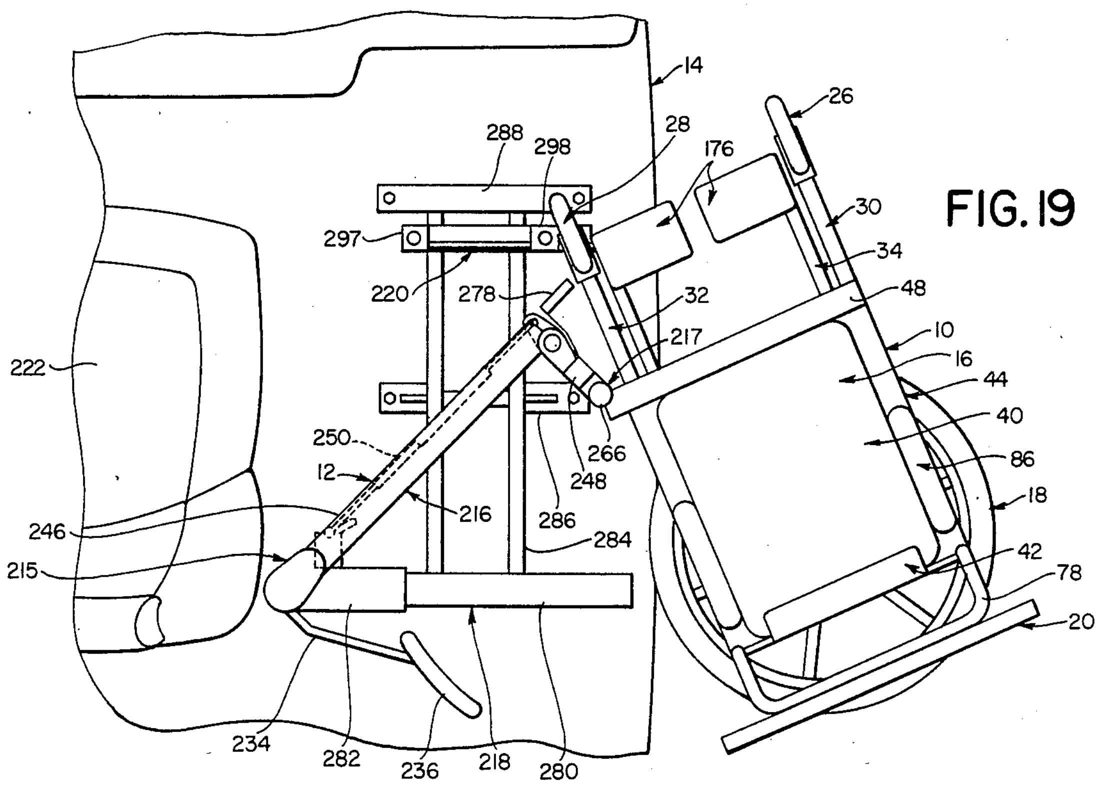

The base assembly 218 is mounted at a chair station in the vehicle 14 adjacent a door opening therein, and it is illustrated most clearly in FIGS. 10, 18 and 19, and it comprises a rear main frame element 280, a frame arm 282, a pair of longitudinal frame members 284, an intermediate transverse frame member 286 and a front transverse frame member 288. The longitudinal frame members 284 are welded to the rear main frame element 280, and the transverse frame members 286 and 288 are welded to the longitudinal frame members 284 so that they are positioned in the manner illustrated in FIGS. 18 and 19. The frame arm 282 is welded to the main frame element 280 so that it extends angularly upwardly and inwardly therefrom as illustrated in FIG. 10, and the column assembly 215 is mounted on the arm 282. The base assembly 218 is installed in the vehicle 14 so that the rear frame member 280 rests on the floor of the vehicle 14, and so that the transverse frame members 286 and 288 rest on the floor and are adapted to be bolted thereto. A jack screw 290 is provided on the main frame member 280 adjacent the end thereof opposite from the arm 282, the jack screw 290 being adjustable to a position wherein it engages the floor of the automobile 14 to provide extra support for the lift assembly 12 when the wheelchair 10 and an occupant thereof are supported by the arm assembly 216. The base assembly 218 is preferably adapted for supporting the column assembly 215 so that when the arm assembly 216 is uncoupled from the wheelchair 10, the column assembly 215 is actually normally disposed at an angle of approximately 93° or 94°; and, as a result, the column assembly is actually angled slightly away from the wheelchair 10 when the wheelchair 10 is positioned along side of the automobile 14. Accordingly, the lift assembly 12 is able to compensate for the compression of one side of the suspension system of the automobile 14 when the wheelchair 10 and an occupant thereof are supported by the arm assembly 214 with the arm assembly 214 in an outwardly extended position. As a result, when the wheelchair 10 and an occupant thereof are swung into the automobile 14, the column assembly 215 is normally disposed in a substantially vertical position, and the arm assembly 216 is normally disposed in a substantially horizontal position in the automobile 14.

The locking assembly 220 is operative in combination with the arm assembly 216, the coupling assembly 217, and the column assembly 215 for supporting the wheelchair 10 in the automobile 14, and it is also operative for releasably locking the wheelchair 10 in the automobile 14. The locking assembly 220 comprises a pair of shot pins 292 which have enlarged ends and are welded to the cross member 58 on the wheelchair 10 so that they extend downwardly beneath the front portion of the seat portion 40. The locking assembly 220 further comprises an anchor unit generally indicated at 294 which is mounted on the longitudinal frame members 284 of the base assembly 218 adjacent the front transverse member 288. The anchor unit 294 comprises a bottom plate 296 which is mounted on the frame members 284, first and second socket blocks 297 and 298 having upwardly opening sockets 299 therein which are dimensioned for receiving the shot pins 292, an interference rod 300 having a lever end portion 301, a collar 302 on the rod 300, a coil spring 304 on the rod 300, a stop 305 on the socket block 297, and a beveled collar 306 on the rod 300. The rod 300 has a reduced portion 308 thereon, and it is slidably received in the blocks 297 and 298 so that it is disposed in substantially perpendicular relation with the sockets 299. The rod 300 is movable between an unlocked position illustrated in FIG. 11 wherein the sockets 299 are unobstructed and a locked position illustrated in FIG. 12 wherein the rod 300 partially obstructs the sockets 299. In this regard, when the rod 300 is in the unlocked position thereof, the terminal portion of the rod 300 is removed from the socket 299 in the block 297, and the reduced portion 308 of the rod 300 is aligned with the socket 299 in the block 298 so that both of the sockets 299 are unobstructed. However, when the rod 300 is in the locked position thereof, the terminal portion of the rod 300 projects into the socket 299 in the block 297, and an intermediate portion of the rod 300 projects into the socket 299 in the block 298. Accordingly, when the shot pins 292 are received in the sockets 299 and the rod 300 is in the unlocked position thereof, the shot pin 292 can be moved upwardly to remove them from the sockets 299. However, when the rod 300 is moved to the locked position thereof, the enlarged terminal portions of the shot pins 292 engage the rod 300 to prevent the shot pins 292 from being removed from the sockets 299. The collar 302 and the spring 304 cooperate to resiliently bias the interference rod 300 to the locked position thereof, whereas the beveled collar 306 is operative for releasably retaining the rod 300 in the unlocked position thereof. In this connection, the block 298 is formed with a beveled end thereon, which is receivable in mating relation with the beveled collar 306 when the rod 300 is in the locked position thereof. However, by moving the rod 300 outwardly against the force of the spring 304, and rotating it one half turn, the block 298 and the beveled collar 306 are no longer receivable in mating relation so that the rod 300 is releasably retained in a retracted or unlocked position.

Wheelchair and Lift Assembly Operation

Accordingly, for normal use and operation, the wheelchair 10 is maintained in an operative or erected position wherein the wheels 18 and 20 are disposed adjacent opposite sides of the chair member 16, the front wheels 26 and 28 are disposed beneath the front portion of the seat portion 40 and the foot support assembly 34 extends downwardly from the front portion of the seat portion 40 between the wheel mounting assemblies 30 and 32. When the wheelchair 10 is in the operative position thereof, it can be propelled on a supporting surface in a conventional manner by rotating the hand rings 106 to rotate the wheels 18 and 20. Further, the foot support assembly 34 can be utilized for supporting the legs and feet of the occupant with the legs positioned so that they extend downwardly from the front portion of the chair member 16. The wheelchair 10 can also be pushed along a supporting surface by a person positioned behind the wheelchair 10 utilizing the handlebar 78, and the wheelchair 10 can be tilted rearwardly on the rear wheels 18 and 20 to move the wheelchair 10 over curbs and the like by a person positioned behind the wheelchair 10 by stepping on the foot pedal 146.

The wheelchair 10 and an occupant thereof can also be effectively transported in the automobile 14 by moving the wheelchair 10 to the collapsed position and repositioning the wheelchair 10 and the occupant inside of the automobile 14 utilizing the lift assembly 12. In order to install the wheelchair 10 and an occupant thereof in the automobile 14, the automobile 14 is first positioned on a substantially level supporting surface, and the wheelchair 10 is positioned along side of the automobile 14 in the manner illustrated in FIG. 18. The arm assembly 216 of the lift assembly 12 is then moved to an extended position wherein the outer end of the outer arm 248 is positioned on the exterior of the automobile 14, and the coupling assembly 217 is manipulated in the manner illustrated in FIGS. 13–15 to couple the wheelchair 10 to the outer arm 248. The control 244 is then operated to raise the wheelchair 10 slightly so that it is lifted off the supporting surface and supported solely by the lift assembly 12. Thereafter, the wheelchair 10 is moved to the collapsed position thereof by moving the wheels 18 and 20 to the collapsed positions thereof, the wheels 30 and 32 to the elevated positions thereof and the foot support assembly 34 to the elevated position thereof. The wheel 20 is moved to the collapsed position thereof by first manipulating the pin 124 of the left locking pin assembly 120 so that the locking pin 132 is removed from the aperture 118 in the bracket 108 in the wheel mounting assembly 24. When the left pin 132 has been removed from the aperture 118, the bracket 108 is free to pivot inwardly on the elbow arm 112 so that it is removed from the rear frame corner bracket 72. The elbow arm 112 can then be pivoted on the shaft 116 while the bracket 108 is further pivoted on the elbow arm 112 in order to position the wheel 20 behind the back portion 42 so that it is wedged in engagement between the stop 136 and the handlebar 78 with the elbow arm 112 in engagement with the stop 134. After the left rear wheel 20 has been moved to the collapsed position thereof in this manner, the right rear wheel 18 can be moved to a collapsed position beneath the seat portion 40. In order to effect this operation the right actuator pin 124 is repositioned in the right slot 122 to remove the right locking pin 132 from the aperture 148 in the bracket 138. Once the right locking pin 132 has been removed from the aperture 148, the bracket 138 is free to swing inwardly on the arm 142, and the arm 142 can be swung inwardly by pivoting the post 144 to reposition the wheel 18 beneath the seat portion 40 until the front portion of the wheel 18 is received and supported on the shelf 150. In order to move the wheels 26 and 28 and the foot support assembly 34 to the raised or elevated positions thereof, the crank 183 is rotated to operate the crank assembly 36 in the manner illustrated in FIGS. 8 and 9. More specifically, the crank handle 183 is rotated in a clockwise direction so that the crankwheel 186 is rotated to cause the bell crank 190 to move the connecting rod 194 forwardly to thereby cause the right arm 192 to raise the foot support assembly 34. As the foot support assembly 34 is raised upwardly, it operates to raise the left arm 192 so that the right and left arms 192 are simultaneously raised upwardly. As a result, the pivot arms 196 attached to the arms 192 are pivoted forwardly, and the right and left pivot arms 204 are moved forwardly with the right and left connector arms 208 to cause the wheel mounting assemblies 30 and 32 to be pivoted forwardly and to cause the wheels 26 and 28 to be thereby moved to the raised or elevated positions thereof.

Once the wheelchair 10 has been moved to the collapsed position thereof, it can be further raised or lowered utilizing the control 244 to properly position it so that it can be moved into the automobile 14 in the manner illustrated in FIGS. 18–20. Thereafter, the wheelchair 10 can be moved into the automobile 14 by moving it through the open door of the automobile 14 and guiding it to a proper location therein. In this regard, since the control arm 250 is normally biased to an expanded position, it operates to generally guide the chair 19 as it is moved into the automobile 14. However, it should be recognized that since the control arm 250 is formed in a telescoping construction, the chair 10 does not actually follow a predetermined path as it is moved into the automobile 14, but it is generally guided by the resiliency of the control arm 250 so that the outer arm 248 is pivoted rearwardly on the main arm 246 as the wheelchair 10 is moved into the automobile 14. As a result, the front wheels 26 and 28 and the foot support assembly 34 are normally moved into the automobile 14 first, and as the arm assembly 216 is pivoted further, the chair member 16 is moved into in the automobile 14 as illustrated in FIG. 20. Once the wheelchair 10 has been moved into the automobile 14 in this manner, it is guided by the stop 305 on the anchor unit 294 so that the shot pins 292 are aligned with the sockets 299, and the anchor unit 294 is moved to the unlocked position thereof. The control unit 244 is then manipulated to lower the wheelchair 10 slightly so that the shot pins 292 are received in the sockets 299, and thereafter, the lever end portion 301 of the rod 300 is pivoted one-half turn to move the anchor unit 294 to the locked position thereof in order to secure the shot pins 292 in the sockets 299. Once the wheelchair 10 has been positioned in the automobile 14 in this manner, it is supported by the anchor unit 292, the arm assembly 216, and the rear support 253 so that it is stabilized in the automobile 14. Further, the headrest 236 is positioned above the handlebar 78 to provide a headrest for the occupant of the wheelchair 10. The door of the vehicle 14 can then be closed, and the wheelchair and the occupant thereof can then be transported in the vehicle 14 as desired.

It is seen therefore that the instant invention provides a wheelchair and a lift assembly which are both effective and practical. The wheelchair 10 can be operated as a conventional wheelchair or it can be moved to a collapsed position for installing it in the automobile 14. The lift assembly 12 is adapted to be coupled to the wheelchair 10, and it is operative for effectively moving the wheelchair 10 into the automobile 14. Both the wheelchair 10 and the lift assembly 12 are relatively simple and easy to operate, and hence they are highly practical for many applications. Further, in many cases they can be effectively operated by an occupant of the wheelchair 10 without assistance. Accordingly, for these reasons as well as the other reasons hereinabove set forth, it is seen that the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A vehicle wheelchair and lift assembly including a vehicle having a door opening and a chair station adjacent said door opening, a collapsible wheelchair and lift means permanently mounted in said vehicle and operable for lifting said wheelchair and an occupant thereof into said vehicle so that said wheelchair is positioned in said chair station, said wheelchair comprising a chair member, a pair of front wheels, means mounting said front wheels on said chair member so that they are normally disposed beneath said chair member and operable for movably supporting the front portion of said chair member on a supporting surface but so that they are movable to raised positions thereof wherein they do not extend downwardly significantly beneath said chair member, a pair of rear wheels, and means mounting said rear wheels on said chair member so that they are normally positioned adjacent opposite sides thereof and operative for movably supporting the rear portion of said chair member on a supporting surface but so that they are movable to collapsed positions thereof wherein they are removed from the opposite sides of said chair member, said lift means comprising a column member mounted in said vehicle in a substantially vertical disposition at a point inboard of said chair station, an elongated main pivot arm attached to said column member so that it is pivotable in a substantially horizontal plane about the axis of said column member, said main pivot arm terminating in an outer end, an outer pivot arm pivotably attached to said main pivot arm adjacent the outer end thereof so that said outer pivot arm is pivotable in a substantially horizontal plane with respect to said main pivot arm, said outer pivot arm terminating in an outer end, coupling means for detachably coupling the outer end of said outer pivot arm to said wheelchair so that said wheelchair is pivotable in a substantially horizontal plane with respect to said outer pivot arm, said main and outer pivot arms being dimensioned so that the combined length thereof is sufficient to extend across said chair station and through said door opening to enable said coupling means to be positiond on the exterior of said vehicle, and column lift means operable for vertically repositioning said main pivot arm on said column member for thereby vertically repositioning said wheelchair and an occupant thereof with respect to said vehicle, whereby said wheelchair and said occupant can be lifted by said lift assembly and then swung into said vehicle through said door opening thereof with said occupant passing feet first through said door opening.

2. The wheelchair and lift assembly of claim 1 further comprising means for releasably anchoring said wheelchair at said chair station in said vehicle.

3. In the wheelchair and lift assembly of claim 1, said vehicle further characterized as an automobile having an open area adapted for normally containing a seat member, said chair station being located in said open area.

4. In the wheelchair and lift assembly of claim 1, said coupling means comprising a first coupling portion permanently mounted on said chair member and a second coupling portion permanently mounted on said outer pivot arm adjacent the outer end thereof, said first and second coupling portions being receivable in interengaged relation for coupling said outer arm to said wheelchair.

5. In the wheelchair and lift assembly of claim 4, said first coupling portion being mounted on said chair member adjacent the forward end of one side thereof.

6. In combination, a vehicle having a door opening and a chair station adjacent said door opening, lift means permenantly mounted in said vehicle and a seat member attached to said lift means, said lift means being operable for moving said seat member from a position wherein it is disposed on the exterior of said vehicle to a position wherein it is disposed within said vehicle, said lift means comprising a column member permanently mounted in said vehicle in a substantially vertical disposition at a point inboard of said chair station, an elongated main pivot arm attached to said column member, said main pivot arm being pivotable in a substantially horizontal plane about the axis of said column member, an outer pivot arm pivotably attached to said main pivot arm so that said outer pivot arm is pivotable in a substantially horizontal plane with respect to said main pivot arm, means for securing said outer pivot arm to said chair member so that said chair member is pivotable in a substantially horizontal plane with respect to said outer pivot arm, said main and outer pivot arms being dimensioned so that the combined length thereof is sufficient to extend across said chair station and through said door opening to enable said coupling means to be positioned on the exterior of said vehicle, and column lift means operable for vertically repositioning said main pivot arm on said column member for thereby vertically repositioning said chair member and an occupant thereof with respect to said automobile whereby said chair member and said occupant can be lifted by said lift assembly and then swung into said vehicle through said door opening with said occupant passing feet first through said door opening.

7. The combination of claim 6 further comprising means for releasably locking said chair member in said vehicle.

8. In the combination of claim 6, said vehicle further characterized as an automobile.

* * * * *